US012552053B2

(12) United States Patent
Merz et al.

(10) Patent No.: US 12,552,053 B2
(45) Date of Patent: Feb. 17, 2026

(54) METHOD FOR TRANSFERRING AT LEAST ONE FILLING NEEDLE OF A NUMBER OF FILLING NEEDLES INTO AN ASEPTIC ISOLATOR

(71) Applicant: Groninger & Co. GmbH, Crailsheim (DE)

(72) Inventors: Armin Merz, Ellwangen (DE); Roland Engelhard, Aurach-Weinberg (DE); Jens Weinmann, Crailsheim (DE)

(73) Assignee: GRONINGER & CO. GMBH, Crailsheim (DE)

( * ) Notice: Subject to any disclaimer, the term of this patent is extended or adjusted under 35 U.S.C. 154(b) by 524 days.

(21) Appl. No.: 17/880,882

(22) Filed: Aug. 4, 2022

(65) Prior Publication Data

US 2022/0379500 A1 Dec. 1, 2022

Related U.S. Application Data

(63) Continuation of application No. PCT/EP2021/052443, filed on Feb. 2, 2021.

(30) Foreign Application Priority Data

Feb. 4, 2020 (DE) ..................... 10 2020 102 765.6

(51) Int. Cl.
*B25J 21/00* (2006.01)
*B01L 1/02* (2006.01)
(Continued)

(52) U.S. Cl.
CPC ............ *B25J 21/005* (2013.01); *B01L 1/025* (2013.01); *B25J 15/0052* (2013.01);
(Continued)

(58) Field of Classification Search
CPC .... B25J 21/005; B25J 15/0052; B25J 9/0096; B01L 1/025; B01L 2200/06;
(Continued)

(56) References Cited

U.S. PATENT DOCUMENTS 2,077,774 A * 4/1937 Rudder .................. A61M 1/02 137/625.42
2,672,272 A * 3/1954 Sidney .................... B65B 3/003 141/276
(Continued)

FOREIGN PATENT DOCUMENTS

CA 2422537 A1 * 9/2003 ............. B65B 3/003
CN 103889388 A * 6/2014 ........... A61J 1/1406
(Continued)

OTHER PUBLICATIONS

Search Report issued by the European Patent Office for application EP 24158132.1 on Jul. 5, 2024.
(Continued)

*Primary Examiner* — Stephen F. Gerrity
*Assistant Examiner* — Eduardo R Ferrero
(74) *Attorney, Agent, or Firm* — Reising Ethington P.C.

(57) ABSTRACT

A method for transferring at least one filling needle of a number of filling needles into an isolator which has a transfer lock, the method having the following steps: providing a first needle carrier within the transfer lock, said needle carrier carrying the number of filling needles; providing a second needle carrier in a first position within the isolator; robot-assisted transferring of the at least one filling needle of the number of filling needles from the first needle carrier to the second needle carrier; and robot-assisted placing of the at least one filling needle of the number of filling needles in the second needle carrier, wherein the at least one filling needle of the number of filling needles is
(Continued)

held directly during the robot-assisted placing. A transfer system, in which such a method can be conducted, is also disclosed.

30 Claims, 10 Drawing Sheets

(51) Int. Cl.
*B25J 15/00* (2006.01)
*B65B 3/00* (2006.01)
*B65B 31/02* (2006.01)
*B65B 35/16* (2006.01)
(52) U.S. Cl.
CPC .............. *B65B 3/003* (2013.01); *B65B 31/02* (2013.01); *B65B 35/16* (2013.01); *B01L 2200/06* (2013.01); *B01L 2200/141* (2013.01)
(58) Field of Classification Search
CPC ....... B01L 2200/141; B01L 2200/0689; B65B 3/003; B65B 31/02; B65B 35/16; B65B 55/027; A61M 5/2066
See application file for complete search history.

(56) References Cited

U.S. PATENT DOCUMENTS

| | | | | | |
|---|---|---|---|---|---|
| 2,687,838 | A * | 8/1954 | Wallingford | B65B 3/003 | 248/128 |
| 3,957,082 | A * | 5/1976 | Fuson | A61M 39/223 | 604/80 |
| 4,111,753 | A * | 9/1978 | Folsom | C12M 41/14 | 435/801 |
| 4,226,235 | A * | 10/1980 | Sarnoff | A61M 5/2066 | 604/191 |
| 4,486,188 | A * | 12/1984 | Altshuler | A61M 1/00 | 604/38 |
| 4,578,064 | A * | 3/1986 | Sarnoff | A61M 5/2066 | 604/137 |
| 5,460,439 | A * | 10/1995 | Jennrich | B01L 1/02 | 312/1 |
| 5,562,882 | A * | 10/1996 | Smith | A61L 2/06 | 422/26 |
| 7,094,222 | B1 * | 8/2006 | Siekas | B01L 3/0206 | 604/191 |
| 7,850,656 | B2 * | 12/2010 | McKay | A61B 17/3478 | 604/173 |
| 8,919,830 | B2 * | 12/2014 | Norton | B01L 1/02 | 414/217 |
| 9,198,992 | B2 * | 12/2015 | Adams | A61L 2/26 | |
| 10,433,928 | B2 * | 10/2019 | Unger | A61B 90/02 | |
| 10,781,002 | B2 * | 9/2020 | Broadbent | B65B 55/027 | |
| 10,793,299 | B2 | 10/2020 | Gay et al. | | |
| 11,014,697 | B2 * | 5/2021 | Cichy | B65B 3/003 | |
| 11,142,355 | B2 * | 10/2021 | Este | A61J 1/20 | |
| 11,420,778 | B2 * | 8/2022 | Trebbi | B25J 15/0608 | |
| 2003/0126799 | A1 * | 7/2003 | Porret | G21F 7/047 | 49/507 |
| 2003/0178097 | A1 * | 9/2003 | Willstumpf | B65B 3/003 | 141/329 |
| 2005/0060962 | A1 * | 3/2005 | Rothbauer | B65B 3/003 | 53/471 |
| 2006/0269637 | A1 * | 11/2006 | Romer | B25J 21/02 | 425/78 |
| 2008/0051937 | A1 * | 2/2008 | Khan | B65B 43/52 | 700/231 |
| 2008/0206020 | A1 * | 8/2008 | Smith | H01L 21/67178 | 901/30 |
| 2008/0279658 | A1 * | 11/2008 | Bachrach | H01L 21/67236 | 414/222.01 |
| 2009/0028669 | A1 * | 1/2009 | Rebstock | H01L 21/67769 | 901/50 |
| 2009/0223592 | A1 | 9/2009 | Procyshyn et al. | | |
| 2010/0084045 | A1 * | 4/2010 | Adams | A61L 2/07 | 141/85 |
| 2010/0262125 | A1 * | 10/2010 | Matusch | A61M 5/2033 | 604/152 |
| 2011/0208350 | A1 * | 8/2011 | Eliuk | B01F 35/2209 | 700/240 |
| 2011/0209410 | A1 * | 9/2011 | Norton | G21F 7/005 | 49/503 |
| 2012/0153610 | A1 * | 6/2012 | Young | G21F 7/005 | 285/335 |
| 2012/0167528 | A1 * | 7/2012 | Consolaro | A61B 5/150618 | 29/527.1 |
| 2014/0026520 | A1 * | 1/2014 | Py | B65B 7/00 | 141/181 |
| 2014/0033809 | A1 * | 2/2014 | Bransky | G01N 1/2035 | 73/64.56 |
| 2014/0202588 | A1 * | 7/2014 | Aguerre | A61M 5/1782 | 141/103 |
| 2014/0341700 | A1 * | 11/2014 | Vopat | B25J 15/0052 | 294/81.1 |
| 2015/0151857 | A1 * | 6/2015 | Lanigan | A61M 5/14248 | 141/18 |
| 2015/0321780 | A1 * | 11/2015 | Py | B65B 43/54 | 141/1 |
| 2016/0346777 | A1 | 12/2016 | Immerzeel | | |
| 2017/0050753 | A1 * | 2/2017 | Glock | A61J 1/201 | |
| 2017/0210496 | A1 * | 7/2017 | Lanigan | A61M 5/14248 | |
| 2018/0037343 | A1 | 2/2018 | Procyshyn | | |
| 2018/0186481 | A1 * | 7/2018 | Franke | B65B 3/006 | |
| 2018/0229866 | A1 * | 8/2018 | Eberhardt | B65B 65/003 | |
| 2019/0077526 | A1 | 3/2019 | Este et al. | | |
| 2019/0106312 | A1 * | 4/2019 | Semmler | B65B 37/06 | |
| 2019/0315004 | A1 | 10/2019 | Bechini et al. | | |
| 2020/0179596 | A1 * | 6/2020 | Dechelette | A61M 5/162 | |
| 2020/0261901 | A1 * | 8/2020 | Mossig | A61L 2/087 | |
| 2020/0262060 | A1 * | 8/2020 | Hosek | B25J 9/0009 | |
| 2021/0170584 | A1 * | 6/2021 | Kopec | B25J 9/1692 | |
| 2021/0292014 | A1 * | 9/2021 | Trebbi | B25J 15/0608 | |
| 2021/0308665 | A1 * | 10/2021 | Farr | G01N 1/2813 | |
| 2022/0184616 | A1 * | 6/2022 | Bennett | B01L 3/502715 | |
| 2022/0339068 | A1 * | 10/2022 | Zimmermann | F04B 49/02 | |

FOREIGN PATENT DOCUMENTS

| | | | | | |
|---|---|---|---|---|---|
| CN | 203937969 | U * | 11/2014 | | |
| CN | 113039123 | A * | 6/2021 | A61J 1/12 | |
| CN | 113041146 | A * | 6/2021 | A61J 1/12 | |
| CN | 116194214 | A * | 5/2023 | B01L 1/02 | |
| DE | 10246061 | A1 * | 4/2004 | B65B 3/003 | |
| DE | 202010004551 | U1 * | 11/2011 | B65B 3/003 | |
| DE | 102011075146 | A1 * | 11/2012 | G01N 35/1011 | |
| DE | 102017216366 | A1 * | 3/2019 | A61L 2/07 | |
| DE | 102019204439 | A1 * | 10/2020 | B25J 21/02 | |
| DE | 102020124826 | A1 * | 3/2022 | B01L 1/02 | |
| DE | 102022101820 | A1 * | 7/2023 | B65D 47/36 | |
| EP | 2534052 | A1 | 12/2012 | | |
| EP | 3335844 | A1 | 6/2018 | | |
| GB | 2237816 | A | 5/1991 | | |
| JP | 3645002 | B2 * | 5/2005 | B65B 3/003 | |
| JP | WO2014054183 | A1 * | 8/2016 | A61J 1/2096 | |
| KR | 20150079498 | A * | 10/2013 | | |
| WO | WO-2014054183 | A1 * | 4/2014 | A61J 1/201 | |
| WO | WO-2015002011 | A1 * | 1/2015 | G16H 70/40 | |
| WO | WO-2015041092 | A1 * | 3/2015 | A61J 3/002 | |
| WO | WO-2016153590 | A2 * | 9/2016 | A61J 1/201 | |
| WO | WO2018024737 | A1 | 2/2018 | | |
| WO | WO2018025092 | A1 | 2/2018 | | |
| WO | WO-2021040983 | * | 3/2021 | B01L 1/04 | |

OTHER PUBLICATIONS

Informal Translation of the Search Report issued by the European Patent Office for application EP 24158132.1 on Jul. 5, 2024.
Examination Report issued by the German Patent Office for application DE 10 2020 102 765.6 on Sep. 2, 2020; 5 pages.

(56) References Cited

OTHER PUBLICATIONS

English translation of the examination report issued by the German Patent Office for application DE 10 2020 102 765.6 on Sep. 2, 2020; 6 pages.
International Search Report and Written Opinion issued for PCT/EP2021/052443 on May 6, 2021.
English translation of the International Preliminary Report on Patentability issued for PCT/EP2021/052443 on Jul. 28, 2022.

* cited by examiner

METHOD FOR TRANSFERRING AT LEAST ONE FILLING NEEDLE OF A NUMBER OF FILLING NEEDLES INTO AN ASEPTIC ISOLATOR

CROSS-REFERENCE TO RELATED APPLICATIONS

This is a Continuation application of International patent application PCT/EP2021/052443, filed Feb. 2, 2021, which claims the priority of German patent application DE 10 2020 102 765.6, filed Feb. 4, 2020. Both application PCT/EP2021/052443 and DE 10 2020 102 765.6 are herewith incorporated by reference in their entirety.

BACKGROUND

The present application relates to a method for transferring at least one filling needle of a number of filling needles into an aseptic isolator. The present application also relates to a transfer system for transferring at least one filling needle of a number of filling needles into an aseptic isolator. The present application also relates to a computer program product.

The present application is primarily concerned with aseptic isolators, which preferably have a filling region for filling objects (e.g. vials, carpules, bottles, syringes and/or the like) with fluid by means of filling needles. The term “isolator” is generally understood to mean a container which is sealed hermetically and in a gas-tight manner from the surrounding working space. A defined atmosphere for processing sensitive or hazardous products can be generated within an isolator.

In this context, isolators are usually used in biopharmaceutical process technology, for example as part of a filling system with several process and processing stations, to create a highly pure or sterile environment and to avoid contamination by bacteria, viruses, germs, pathogens and/or the like.

In the prior art, isolators are often used in the final filling process, where a fluid is transferred into an object with the aid of filling elements (e.g. filling needles, injection nozzles, etc.). Such isolators generally have one or more transfer locks, by means of which biopharmaceutical utensils, for example filling elements, objects and/or fluid communication means (e.g. hoses, tubes, lines, etc.), can be introduced into the isolator in a sterile manner. The biopharmaceutical utensils are fed into the clean room by means of a bag connection, for example.

Such a structure is shown, for example, in the document EP 2 534 052 B1, which generally relates to a method and a system by which an end container is filled, in a sterile environment, with fluids intended for the biopharmaceutical sector. A sterile bag containing so-called “internal means and elements”, for example filling elements and fluid communication means, is connected to the clean room by means of an opening which is provided in the bag and which is complementary to a door of a clean room. The internal means and elements are then transferred from the bag into the clean room and assigned to an end container.

The transfer of filling elements, fluid communication means and/or objects into a clean room and the subsequent further processing therein are usually carried out by means of glove ducts. Such glove ducts permit isolated intervention in the isolator without contaminating the biopharmaceutical products, product-contacting parts and/or materials contained in the isolator. The glove ducts often directly adjoin the transfer lock or the media connection, such that the filling needles and/or objects can be manually inserted into the isolator or removed from it.

However, this “manual” handling is extremely time-consuming. Furthermore, glove ducts, which in practice are made of rubber or plastic, in particular butyl, may quickly become damaged when gripping filling elements, in particular filling needles, syringes with cannulas or the like. Glove interventions therefore also pose an increased risk of contamination and/or an increased safety risk as a result of leaks. In addition, manual processing or manipulation of filling needles, in particular as regards the filling of objects, may not meet the high demands placed on dosing accuracy and the reproducibility of pharmaceutical or cosmetic products.

Against this background, the handling of such filling members within isolators is increasingly being taken over by robots. Manufacturers are meanwhile developing isolators that increasingly reduce human intervention during a filling process in a filling station, so as to reduce the risk of contamination.

For example, the publication WO 2018/025092 A1 deals with a method and a system for the aseptic filling of pharmaceutical containers with pharmaceutical liquid. The method and the system are based on an aseptically sealable chamber which has a partition wall on which pre-compressed pharmaceutical source containers and receiving containers are aseptically mounted. Arranged in the chamber are a robot arm, a syringe carrier, with syringes provided therein, and a sterilization system, which produces an aseptic state in the chamber. The robotic arm is able to grasp and control an individual syringe of the number of syringes provided in the needle holder in order to inject pharmaceutical products into the containers and/or extract same from the containers by pushing the needle of the syringe through the closure piece of a container.

The publication WO 2018/025092 A1 thus discloses a robot-assisted filling system which, by means of a robot gripper, moves a number of syringes individually within an aseptically closable chamber between a syringe carrier and a filling position. Each syringe is provided with a syringe cap and is already arranged in the syringe carrier at the beginning of the process. The syringe cap is removed from the syringe before each filling or extraction process and put back in place again after the syringe has been used. The sterilization system also establishes the aseptic state only when the syringes are already provided inside the chamber.

Furthermore, the document US 2009/0223592 A1 relates, for example, to robot-assisted filling systems and methods for filling containers with a product, in particular a pharmaceutical, liquid or toxic product. A robotic holding arm, for holding and transporting a holder provided with end containers, is arranged within the isolator chamber. The isolator has at least one port which allows containers to be introduced aseptically into the interior of the isolator. Furthermore, a robotic filling arm is arranged inside the isolator, which filling arm is equipped with a filling hose and carries out the filling of the containers by means of pattern or position recognition. The filling system has complementary glove ducts for manual work.

None of the known systems and methods solves the aforementioned problem regarding the manual transfer of filling needles into an aseptic isolator. In the system known from WO 2018/025092 A1, the syringes are already arranged in the sealable chamber before the aseptic state is produced. By contrast, in the abovementioned US 2009/0223592 A1, the transfer of filling needles into the isolator is dispensed with entirely.

BRIEF SUMMARY

It is therefore an object of the present application to make available an improved method and an improved transfer system for transferring at least one filling needle of a number of filling needles into an aseptic isolator.

According to a first aspect of the application, a method for transferring at least one filling needle of a number of filling needles into an isolator, in particular an aseptic isolator having a transfer lock, is proposed. The method comprises the following steps:

- providing of a first needle carrier within the transfer lock, said needle carrier carrying the number of filling needles;
- providing of a second needle carrier in a first position within the aseptic isolator;
- robot-assisted transfer of the at least one filling needle of the number of filling needles from the first needle carrier to the second needle carrier; and
- robot-assisted placing of the at least one filling needle of the number of filling needles in the second needle carrier, wherein the at least one filling needle of the number of filling needles is held directly during the robot-assisted placing.

As was mentioned at the outset, the term "isolator" is to be understood here as a container which is sealed hermetically and in a gas-tight manner from the surrounding working space. The term isolator chamber can also be used for the isolator. A defined atmosphere for processing sensitive or hazardous products, in particular pharmaceutical or cosmetic products, can be generated within the isolator. The isolator can be an aseptic isolator. An aseptic isolator can be, for example, a clean room, an ultraclean room or the like.

Furthermore, the term "transfer lock" here denotes a device for the transition between two regions with preferably different properties, in particular a region within the aseptic isolator and a region outside the aseptic isolator. In the context of the present application, the transfer lock is preferably configured in such a way that an aseptic state is provided within the transfer lock or can optionally be produced. It can thereby be ensured that the articles to be transferred do not impair or destroy the existing aseptic state within the aseptic isolator. Such methods for producing an aseptic environment within the transfer lock are known in the industry.

Providing or producing an aseptic state in the interior of the transfer lock is to be understood as providing or producing this state in the entire inner environment of the transfer lock and also on substantially all exposed inner surfaces of the transfer lock. This includes the surfaces of all objects, containers, subsystems and/or the like that are exposed to the interior atmosphere of the transfer lock.

In the present case, such a transfer lock can be, for example, a flexible sterile bag via which the articles arrangeable in the sterile bag (e.g. filling needles, needle carriers, objects, etc.) are fed, in a pre-sterilized state, through a lock system or closure system to the aseptic isolator, preferably for filling the objects. Such sterile bags are known in isolator technology. They generally have an adapter with which the sterile bag can be coupled in a sterile manner, for example, to a so-called alpha port of the aseptic isolator. An alpha port can be a recess, e.g. a through-hole and/or a door or the like, in a wall portion of the aseptic isolator. The sterile bag can have a beta port, which can be configured for example as a door or the like, which is attached to the alpha port in such a way that the alpha port and the beta port can be opened together.

Alternatively, however, the transfer lock can also be configured as a rigid transport container which has a beta port and can be coupled to the alpha port of the aseptic isolator according to the aforementioned principle, in order to permit a sterile transfer of the articles arrangeable therein into the aseptic isolator. An example of a configuration is shown in GB 2 237 816 A.

The term "needle carrier" is to be understood here as a device which is configured to carry a number of filling needles. The number of filling needles can be carried in different ways. For example, the needle carrier can have at least one through-hole for carrying at least one filling needle therein. In principle, however, other types of connection are also conceivable. Optionally, the at least one filling needle can be arranged magnetically in or on a needle carrier. Such a magnetic arrangement can facilitate the handling of the at least one filling needle, in particular with regard to the robot-assisted placing (e.g. self-centering) of the same in the receptacle of the needle carrier. Provision can also be made that the at least one filling needle is arranged with form-fit engagement in or on the needle carrier (for example by means of a clip connection or snap connection).

Furthermore, the number of filling needles can be arranged in a regular or irregular arrangement in the first needle carrier. A regular arrangement can be, for example, a linear regular arrangement (e.g. in the form of a matrix) or a circular regular arrangement (e.g. in the form of a circular pattern). The same applies to the arrangement of the at least one filling needle in the second needle carrier.

The term "held directly" is to be understood here as meaning that the at least one filling needle is held directly by means of a robot end effector. It is not held indirectly (e.g. by holding of the needle carrier itself) by means of the robot end effector. The at least one filling needle can be held mechanically, in particular by form-fit or force-fit engagement, or magnetically. For example, the at least one filling needle can be held in a robot-assisted manner by means of a releasable clip connection. The at least one filling needle can also be gripped directly by means of a robot gripper.

The term "gripped directly" is to be understood here as meaning that the at least one filling needle is gripped directly by means of a robot gripper. It is not gripped indirectly (e.g. by gripping of the needle carrier itself) by means of the robot gripper.

The term "robot-assisted" or "robot" is to be understood here as meaning that the identified method steps (e.g. the step of robot-assisted transfer and the step of robot-assisted placing, etc.) are carried out by means of an automated movement apparatus of any kind. This can be, for example, a handling unit, a manipulator, a kinematics system or the like that forms the robot. The movement apparatus can be, for example, a construction with multi-axis movements of any kind. For example, such a construction can have two to six axis movements of any kind.

According to a second aspect of the application, a transfer system for transferring at least one filling needle of a number of filling needles into an isolator, in particular an aseptic isolator, is proposed, the transfer system comprising:

- the aseptic isolator, which has a transfer lock, wherein a first needle carrier, which carries the number of filling needles, is provided within the transfer lock, and wherein a second needle carrier is provided in a first position within the aseptic isolator;

at least one robot with a robot end effector, which is arranged inside the aseptic isolator; and a controller which is configured in such a way that the following steps are carried out:

robot-assisted transferring of the at least one filling needle of the number of filling needles from the first needle carrier to the second needle carrier; and robot-assisted placing of the at least one filling needle of the number of filling needles in the second needle carrier, wherein the at least one filling needle of the number of filling needles is held directly by the robot end effector during the robot-assisted placing.

The at least one robot according to the second aspect of the application has a support structure, in particular an articulated support structure, at the end of which a robot end effector is arranged. The support structure is configured to move the robot end effector in all three spatial directions.

According to a third aspect of the application, a computer program with a proposed program code is proposed which is configured, when executed in the controller of the transfer system according to the second aspect of the application, to carry out the following steps:

robot-assisted transferring of the at least one filling needle of the number of filling needles from the first needle carrier to the second needle carrier; and robot-assisted placing of the at least one filling needle of the number of filling needles in the second needle carrier, wherein the at least one filling needle of the number of filling needles is held directly during the robot-assisted placing.

By providing the number of filling needles in a first needle carrier within the transfer lock, the subsequent robot-assisted transfer of the at least one filling needle of the number of filling needles to the second needle carrier within the aseptic isolator is greatly simplified. In particular, complicated unpacking and/or orientation of the number of filling needles can thereby be avoided, since the number of filling needles is already arranged in a predefined orientation in the first needle carrier.

Complementary to the first needle carrier, a second needle carrier is provided within the aseptic isolator. By the robot-assisted transfer of the at least one filling needle of the number of filling needles from the first needle carrier to the second needle carrier and the robot-assisted placing of the at least one filling needle of the number of filling needles in the second needle carrier, with the at least one filling needle of the number of filling needles being held directly during the robot-assisted placing, an automated and safe transfer of the at least one filling needle into the aseptic isolator can be realized.

According to a fourth aspect of the application, a method is further proposed for transferring a number of filling needles to a filling position within an isolator, in particular an aseptic isolator having a transfer lock, the method comprising the following steps:

providing of a needle carrier, the needle carrier having a base body, for carrying the number of filling needles, and a receptacle;

robot-assisted picking-up of the needle carrier via the receptacle, the needle carrier carrying the number of filling needles;

robot-assisted transferring of the needle carrier with the number of filling needles to the filling position within the isolator; and robot-assisted placing of the needle carrier in the filling position within the isolator.

The needle carrier according to the fourth aspect of the application has a base body and a receptacle. The base body can, for example, be block-shaped or cuboid. Alternatively, the base body can also be cylindrical or have other common shapes (e.g. triangular shapes, polygonal shapes or the like). The needle carrier is preferably picked up by means of a robot end effector. Such robot-assisted picking-up of the needle carrier can take place in different ways. For example, the needle carrier can be picked up mechanically, in particular by force-fit or form-fit engagement. Alternatively, the robot-assisted picking-up of the needle carrier can also be carried out magnetically, for example.

According to a fifth aspect of the application, a transfer system is proposed for transferring a number of filling needles to a filling position within an isolator, in particular an aseptic isolator, the transfer system comprising:

the isolator, which has a transfer lock;

a needle carrier, the needle carrier having a base body, for carrying the number of filling needles, and a receptacle;

at least one robot with a robot end effector, which is arranged inside the aseptic isolator; and a controller which is configured in such a way that the following steps are carried out:

robot-assisted picking-up of the needle carrier via the receptacle, the needle carrier carrying the number of filling needles;

robot-assisted transferring of the needle carrier with the number of filling needles to the filling position within the isolator; and robot-assisted placing of the needle carrier in the filling position within the aseptic isolator.

The at least one robot according to the fifth aspect of the application has a support structure, in particular an articulated support structure, at the end of which a robot end effector is arranged. The support structure is configured to move the robot end effector in all three spatial directions.

According to a sixth aspect of the application, a computer program with a program code is proposed which is configured, when executed in the controller of the transfer system according to the fifth aspect of the application, to carry out the following steps:

robot-assisted picking-up of the needle carrier via the receptacle, the needle carrier carrying the number of filling needles;

robot-assisted transferring of the needle carrier with the number of filling needles to the filling position within the isolator; and robot-assisted placing of the needle carrier in the filling position within the aseptic isolator.

According to a seventh aspect of the application, a method is proposed for transferring at least one filling needle of a number of filling needles from an isolator, in particular an aseptic isolator having a transfer lock, the method comprising the following steps:

providing of a first needle carrier within the transfer lock;

providing of a second needle carrier, which carries the number of filling needles, in a first position within the isolator;

robot-assisted removing of the at least one filling needle of the number of filling needles from the second needle carrier, the at least one filling needle of the number of filling needles being held directly during the robot-assisted removing; and robot-assisted transferring of the at least one filling needle of the number of filling needles from the second needle carrier to the first needle carrier.

According to an eighth aspect of the application, a transfer system is proposed for transferring at least one filling needle of a number of filling needles from an isolator, in particular an aseptic isolator, the transfer system comprising:

the isolator, which has a transfer lock, a second needle carrier being provided in a first position within the isolator, the second needle carrier carrying the number of filling needles;

a first needle carrier;

at least one robot with a robot end effector, which is arranged inside the isolator; and a controller which is configured in such a way that the following steps are carried out:

robot-assisted removing of the at least one filling needle of the number of filling needles from the second needle carrier, the at least one filling needle of the number of filling needles being held directly by the robot end effector during the robot-assisted removing; and robot-assisted transferring of the at least one filling needle of the number of filling needles from the second needle carrier to the first needle carrier.

According to a ninth aspect of the application, a computer program with a program code is proposed, which is configured, when executed in the controller of the transfer system according to the eighth aspect of the application, to carry out the following steps:

robot-assisted removing of the at least one filling needle of the number of filling needles from the second needle carrier, the at least one filling needle of the number of filling needles being held directly by the robot end effector during the robot-assisted removing; and robot-assisted transferring of the at least one filling needle of the number of filling needles from the second needle carrier to the first needle carrier.

According to a tenth aspect of the application, a method is proposed for transferring a number of filling needles from a filling position within an isolator, in particular an aseptic isolator having a transfer lock, the method comprising the following steps:

providing of a needle carrier in the filling position, the needle carrier having a base body, for carrying the number of filling needles, and a receptacle;

robot-assisted picking-up of the needle carrier via the receptacle, the needle carrier carrying the number of filling needles;

robot-assisted removing of the needle carrier from the filling position within the isolator;

robot-assisted transferring of the needle carrier with the number of filling needles from the filling position.

According to an eleventh aspect of the application, a transfer system is proposed for transferring a number of filling needles from a filling position within an isolator, in particular an aseptic isolator, the transfer system comprising:

the isolator, which has a transfer lock;

a needle carrier, the needle carrier having a base body, for carrying the number of filling needles, and a receptacle;

at least one robot with a robot end effector, which is arranged inside the isolator; and a controller which is configured in such a way that the following steps are carried out:

robot-assisted picking-up of the needle carrier via the receptacle, the needle carrier carrying the number of filling needles;

robot-assisted removing of the needle carrier from the filling position inside the isolator;

robot-assisted transferring of the needle carrier with the number of filling needles from the filling position.

According to a twelfth aspect of the application, a computer program with a program code is proposed which is configured, when executed in the controller of the transfer system according to the eleventh aspect of the application, to carry out the following steps:

robot-assisted picking-up of the needle carrier via the receptacle, the needle carrier carrying the number of filling needles;

robot-assisted removing of the needle carrier from the filling position within the isolator;

robot-assisted transferring of the needle carrier with the number of filling needles from the filling position.

In one refinement of the method according to the first aspect, it can be provided that the second needle carrier is in a filling station, in which objects are filled with a fluid, in particular a pharmaceutical or a cosmetic fluid, by means of the at least one filling needle of the number of filling needles.

An advantage of this refinement is that the at least one filling needle of the number of filling needles is arranged directly in a filling station for filling the objects, as a result of which further work steps (e.g. further positioning of the number of filling needles within the aseptic isolator to complete the filling of objects) can be avoided.

In a further refinement of the method according to the first aspect, it can be provided that the at least one filling needle of the number of filling needles is transferred collectively from the first needle carrier to the second needle carrier.

In other words, this means that the at least one filling needle of the number of filling needles is grasped directly and collectively (i.e. "all at once") from the first needle carrier and finally arranged collectively in the second needle carrier. An advantage of this refinement is a high throughput of filling needles (i.e. the number of filling needles transferred per unit of time), which in turn results in more efficient operation of the aseptic isolator. The collective transfer of the at least one filling needle proves to be particularly advantageous when the first needle carrier and the second needle carrier are substantially identical, i.e. have the same filling needle spacings and the same filling needle arrangement.

In a further refinement of the method according to the first aspect, it can be provided that the at least one filling needle of the number of filling needles is transferred individually from the first needle carrier to the second needle carrier.

In other words, this means that the at least one filling needle of the number of filling needles is grasped directly and individually from the first needle carrier and finally arranged individually in the second needle carrier. An advantage of this refinement is that the step of placement in the second needle carrier can also take place when the first needle carrier and the second needle carrier differ in terms of a filling needle arrangement and/or the filling needle spacings.

In a further refinement of the method according to the first aspect, it can be provided that the step of robot-assisted transfer of the at least one filling needle of the number of filling needles from the first needle carrier to the second needle carrier has the following steps:

first robot-assisted transfer of the at least one filling needle of the number of filling needles from the first needle carrier to a third needle carrier arranged in a second position within the aseptic isolator, the second position being spaced apart from the first position;

robot-assisted placing of the at least one filling needle of the number of filling needles in the third needle carrier; and wherein the step of the robot-assisted placing of the at least one filling needle of the number of filling needles in the second needle carrier comprises the following step:

second robot-assisted transfer of the at least one filling needle of the number of filling needles from the third needle carrier to the second needle carrier, the at least one filling needle of the number of filling needles being held directly during the second robot-assisted transfer.

In this refinement, the robot-assisted transfer of the at least one filling needle of the number of filling needles from the first needle carrier to the second needle carrier takes place by means of a third needle carrier, which is likewise located inside the aseptic isolator. An advantage of this refinement is that, if handling of the at least one filling needle is too difficult and/or a distance between the first needle carrier and the second needle carrier is beyond the reach of a robot end effector, the at least one filling needle can still be placed in the second needle carrier.

In a further refinement of the method according to the first aspect, it can be provided that the third needle carrier is an intermediate carrier in which the at least one filling needle is carried before it is transferred to the second needle carrier.

In other words, this means that the at least one filling needle of the number of filling needles is “parked” in the third needle carrier. An advantage of this refinement is that, if handling of the at least one filling needle is too difficult and/or a distance between the first needle carrier and the second needle carrier is beyond the reach of a robot end effector, the at least one filling needle can still be placed in the second needle carrier.

In a further refinement of the method according to the first aspect, it can be provided that the at least one filling needle of the number of filling needles is transferred collectively from the first needle carrier to the third needle carrier.

The at least one filling needle of the number of filling needles is grasped directly and collectively from the first needle carrier and arranged collectively in the third needle carrier. An advantage of this refinement is a high throughput of filling needles (i.e. number of filling needles transferred per unit of time), which in turn results in more efficient operation of the aseptic isolator.

In a further refinement of the method according to the first aspect, it can be provided that the at least one filling needle of the number of filling needles is transferred individually from the first needle carrier to the third needle carrier.

The at least one filling needle of the number of filling needles is grasped directly and individually from the first needle carrier and then arranged individually in the third needle carrier.

An advantage of this refinement is that the step of placement in the third needle carrier can also be carried out without any problem if the first needle carrier and the second needle carrier differ in terms of a filling needle arrangement and/or the filling needle spacing.

In a further refinement of the method according to the first aspect, it can be provided that, when the at least one filling needle of the number of filling needles is transferred collectively from the first needle carrier to the third needle carrier, the at least one filling needle of the number of filling needles is transferred individually from the third needle carrier to the second needle carrier.

This refinement proves advantageous as regards transfer efficiency. For example, when a filling needle arrangement in the first needle carrier corresponds substantially to a filling needle arrangement in the third needle carrier, and a filling needle arrangement in the second needle carrier differs from the filling needle arrangement in the third needle carrier.

In a further refinement of the method according to the first aspect, it can be provided that, when the at least one filling needle of the number of filling needles is transferred individually from the first needle carrier to the third needle carrier, the at least one filling needle of the number of filling needles is transferred collectively from the third needle carrier to the second needle carrier.

This refinement proves advantageous as regards transfer efficiency. For example, if a filling needle arrangement in the first needle carrier differs from a filling needle arrangement in the third needle carrier, and a filling needle arrangement in the second needle carrier corresponds substantially to the filling needle arrangement in the third needle carrier.

In a further refinement of the method according to the first aspect, it can be provided that the step of robot-assisted transfer of the at least one filling needle of the number of filling needles from the first needle carrier to the second needle carrier comprises the following steps:

first robot-assisted transfer of the first needle carrier together with the number of filling needles from the transfer lock to a second position within the aseptic isolator, the second position being spaced apart from the first position;

robot-assisted placing of the first needle carrier in the second position; and wherein the step of the robot-assisted placing of the at least one filling needle of the number of filling needles in the second needle carrier comprises the following step:

second robot-assisted transfer of the at least one filling needle of the number of filling needles from the first needle carrier to the second needle carrier, the at least one filling needle of the number of filling needles being held directly during the second robot-assisted transfer.

Thus, the needle carrier, together with the number of filling needles arranged therein, is transferred from the transfer lock into the aseptic isolator and arranged in a second position, which corresponds to an intermediate position. The number of filling needles can thus be brought into the aseptic isolator simultaneously without holding the filling needles directly. The direct picking-up of the needle carrier greatly simplifies the gripping and transfer to the aseptic isolator and saves time.

In a further refinement of the method according to the first aspect, it can be provided that the at least one filling needle of the number of filling needles is transferred collectively from the first needle carrier, arranged in the second position, to the second needle carrier.

This refinement proves advantageous as regards transfer efficiency. For example, when a filling needle arrangement in the first needle carrier corresponds substantially to a filling needle arrangement in the second needle carrier.

In a further refinement of the method according to the first aspect, it can be provided that the at least one filling needle of the number of filling needles is transferred individually from the first needle carrier, arranged in the second position, to the third needle carrier.

This refinement proves advantageous as regards transfer efficiency. For example, when a filling needle arrangement in the first needle carrier differs from a filling needle arrangement in the second needle carrier.

In a further refinement of the method according to the first aspect, it can be provided that the first needle carrier has a base body, for carrying the number of filling needles, and at least one projection, the at least one projection extending from the base body and having a circular cylindrical shape.

Such a projection facilitates, for example, a (releasable) coupling of the first needle carrier to a robot end effector, which has a corresponding counter-receptacle for gripping and transferring the first needle carrier. The first needle carrier can, for example, have exactly one projection. Alternatively, the first needle carrier can also have two or more projections in order to ensure that the needle carrier is additionally secured against rotation.

The shape of the projection is not limited to circular cylindrical shapes. Other shapes (e.g. prismatic or triangular, rectangular or cuboid or the like) are also possible. Alternatively, the needle carrier can be coupled to the robot end effector mechanically for example, in particular by force-fit or form-fit engagement, or magnetically.

In a further refinement of the method according to the first aspect, it can be provided that each of the at least one projection is shaped in such a way that a robot gripper of a robot end effector, which is configured to grip a single filling needle of the number of filling needles or an object to be filled by means of the single filling needle of the number of filling needles, in particular a pharmaceutical or cosmetic object, can receive said projection.

The picking-up of the at least one projection preferably takes place simultaneously, such that each of the at least one projection is picked up, in particular picked up simultaneously, by means of a robot gripper of a robot end effector. For example, the needle carrier can have exactly one projection, which can be picked up by means of a robot gripper that can grip a single filling needle or an object to be filled by means of the single filling needle. Alternatively, the needle carrier can have exactly two projections, in particular wherein the spacing between each other preferably corresponds to the spacing between two adjacent filling needles and/or to the spacing between two adjacent robot grippers. Each of the two needle carriers is thus assigned a corresponding robot gripper. However, the number of projections can also be greater than two (e.g. three, four, five, etc.).

By means of this refinement, a synergy effect can be generated which facilitates the interaction with the robot end effector. In other words, it is thereby possible to achieve a multi-functional use and, as a result thereof, a less complex structure of the robot end effector. Furthermore, by providing more than one projection, the needle carrier can be secured against rotation.

In a further refinement of the method according to the first aspect, the following step can also be provided: robot-assisted opening of the transfer lock before the step of robot-assisted transfer of the at least one filling needle of the number of filling needles from the first needle carrier to the second needle carrier.

An advantage of this refinement is that the transfer lock can already be opened without the need for gloves, which can further increase a degree of automation of the method.

In one refinement of the method according to the fourth aspect, it can be provided that the needle carrier with the number of filling needles is provided within the transfer lock.

In other words, this means that the needle carrier with the number of filling needles is first made available within the transfer lock. Proceeding from the transfer lock, the needle carrier is finally brought to the filling position with robot assistance. An advantage of this refinement is the simpler handling of the number of filling needles.

In a further refinement of the method according to the fourth aspect, it can be provided that the needle carrier is provided in a position within the isolator that is spaced apart from the filling position, the method having the following steps prior to the step of robot-assisted transfer:

- providing of a transfer lock needle carrier within the transfer lock, the transfer lock needle carrier carrying the number of filling needles;
- robot-assisted transfer of the number of filling needles from the transfer lock needle carrier to the needle carrier;
- robot-assisted placing of the number of filling needles in the needle carrier, the number of filling needles being held directly during the robot-assisted transfer to the needle carrier.

The term “held directly” is to be understood here as meaning that the at least one filling needle is held directly by means of a robot end effector. It is not held indirectly (e.g. by holding of the needle carrier itself) by means of the robot end effector. The at least one filling needle can be held mechanically, in particular by form-fit or force-fit engagement, or magnetically. For example, the at least one filling needle can be held in a robot-assisted manner by means of a releasable clip connection. The at least one filling needle can also be gripped directly by means of a robot gripper.

Accordingly, the number of filling needles is first removed directly from the transfer lock needle holder and arranged in the needle carrier within the isolator. The number of filling needles can be transferred individually or collectively from the transfer lock needle carrier to the needle carrier.

In a further refinement of the method according to the fourth aspect, it can be provided that, during the robot-assisted transfer, the needle carrier is transferred by means of more than one robot, the needle carrier being transferred from one robot to a further robot.

The use of more than one robot can be advantageous, for example, when a distance to be “bridged” between the starting position of the needle carrier and the filling position of the needle carrier exceeds the reach of one or more robots. The transfer of the needle carrier can, for example, be such that the needle carrier is placed by one robot in an intermediate position within the isolator before the needle carrier is picked up by a further robot and transferred to the filling position. Alternatively, the needle carrier can, for example, also be transferred directly (i.e. without the temporary placement in an intermediate position).

In a further refinement of the method according to the fourth aspect, it can be provided that the receptacle is at least one projection which extends from the base body, each projection of the at least one projection being shaped in such a way that a robot gripper of a robot end effector, which is configured to pick up a single filling needle of the number of filling needles or an object to be filled by means of the single filling needle, in particular a pharmaceutical or cosmetic object, can pick up said projection.

The picking-up of the at least one projection preferably takes place simultaneously, such that each of the at least one projection is picked up by means of a robot gripper of a robot end effector, in particular picked up simultaneously. For example, the needle carrier can have exactly one projection which can be picked up by means of a robot gripper that can pick up a single filling needle or an object to be filled by means of the single filling needle. Alternatively, the needle carrier can have exactly two projections, in particular with the spacing between each other preferably corresponding to the spacing between two adjacent filling needles and/or the spacing between two adjacent robot grippers. Each of the two needle carriers is thus assigned a corresponding robot gripper. However, the number of the projections can also be greater than two (e.g. three, four, five, etc.).

By means of this refinement, a synergy effect can be generated which facilitates the interaction with the robot end effector. In other words, it is thereby possible to achieve a multi-functional use and, as a result thereof, a less complex structure of the robot end effector. Furthermore, by providing more than one projection, the needle carrier can be secured against rotation.

In a further refinement of the method according to the fourth aspect, it can be provided that each projection of the at least one projection has a circular cylindrical shape.

By means of this refinement, a synergy effect can be generated which facilitates the interaction with a robot end effector. In other words, it is thereby possible to achieve a multifunctional use and, as a result thereof, a less complex structure of the robot end effector.

In a further refinement of the method according to the fourth aspect, it can be provided that the robot-assisted picking-up of the needle carrier is carried out via the receptacle by means of a clip connection.

A clip connection is to be understood here as the releasable, form-fit joining of elements or components. The clip connection according to the application can be configured, for example, in such a way that a robot end effector, in particular a number of robot grippers of a robot end effector, has a clip element that clips onto the receptacle of the needle carrier (i.e. onto each projection of the at least one projection).

In a further refinement of the method according to the fourth aspect, it can be provided that the robot-assisted picking-up of the needle carrier is carried out via the receptacle by means of a magnetic connection.

An advantage of this refinement is the simplified handling of the needle carrier. For example, the receptacle can have a ferromagnetic element or a magnet, in order to permit magnetic coupling to a correspondingly configured robot end effector.

In a further refinement of the method according to the fourth aspect, it can be provided that the needle carrier arranged in the filling position is in a filling station in which a number of objects are filled with a fluid, in particular a pharmaceutical or a cosmetic fluid, by means of the number of filling needles.

An advantage of this refinement is that the number of filling needles is arranged directly in a filling station for filling the objects, as a result of which further work steps (e.g. further positioning of the number of filling needles within the aseptic isolator in order to carry out the filling of objects) can be avoided.

In a further refinement of the method according to the fourth aspect, it can be provided that the needle carrier is received directly in the filling station during filling of the number of objects.

In other words, this means that the needle carrier is not parked in the filling position, but instead remains directly on a performing robot end effector. A filling needle movement, in particular a relative movement between filling needle and object during the filling process in the filling station, can thus take place with robot assistance. An advantage of this refinement is the high degree of filling accuracy.

Alternatively, the robot-assisted placing of the needle carrier in the filling position within the isolator can be such that the needle carrier is parked in the filling position. In this case, the needle carrier does not remain in the performing robot end effector during the filling process.

In a further refinement of the method according to the fourth aspect, it can be provided that the method furthermore has the step: robot-assisted opening of the transfer lock before the needle carrier is picked up via the receptacle.

An advantage of this refinement is that the transfer lock can already be opened without the need for gloves, which can further increase a degree of automation of the method.

In a further refinement of the method according to the first, fourth, seventh or tenth aspect, it can be provided that the number of filling needles is fluidically connected, by means of a number of tubes, to a source container and/or a conveying means for conveying the fluid.

An advantage of this refinement is that such a filling needle can feed a larger amount of fluid into the aseptic isolator than would be possible, for example, with a filling needle without a tube (e.g. a conventional syringe). A conveying means (e.g. at least one pump) for conveying the fluid is preferably arranged between the number of filling needles and the source container. This conveying means can be, for example, a peristaltic pump, a rotary piston pump or the like.

In a further refinement of the method according to the first, fourth, seventh or tenth aspect, it can be provided that the number of tubes cross through a wall of the lock in a sterile manner.

In a further refinement of the method according to the first, fourth, seventh or tenth aspect, it can be provided that the number of filling needles is a single filling needle. It can also be provided that the number of filling needles is two filling needles. The number of filling needles can also be formed by more filling needles. For example, the number of filling needles can be formed by three, four, five or six filling needles.

In one refinement of the transfer system according to the second, fifth, eighth or eleventh aspect, it can be provided that the aseptic isolator and the transfer lock share a common wall portion, and an opening extends through the common wall, with a door releasably locking the opening.

In one refinement of the transfer system according to the second, fifth, eighth or eleventh aspect, it can be provided that the number of filling needles is fluidically connected, by means of a number of tubes, to a source container and/or a conveying means for conveying the fluid.

An advantage of this refinement is that such a filling needle can feed a larger amount of fluid into the aseptic isolator than would be possible, for example, with a filling needle without a tube (e.g. a conventional syringe). A conveying means (e.g. at least one pump) for conveying the fluid is preferably arranged between the number of filling needles and the source container. This conveying means can be, for example, a peristaltic pump, a rotary piston pump or the like.

It will be appreciated that the refinements of the method according to the first aspect of the application also apply analogously to the method according to the seventh aspect of the application. Furthermore, the refinements of the method according to the fourth aspect of the application also apply analogously to the method according to the tenth aspect of the application.

It will be appreciated that the aforementioned features and the features still to be explained below can be used not only in the respectively cited combination, but also in other combinations or singly, without departing from the scope of the present invention.

BRIEF DESCRIPTION OF THE SEVERAL VIEWS OF THE DRAWING

Embodiments of the application explained in more detail in the following description and are shown in the drawing, in which.

DETAILED DESCRIPTION

Figure 1:
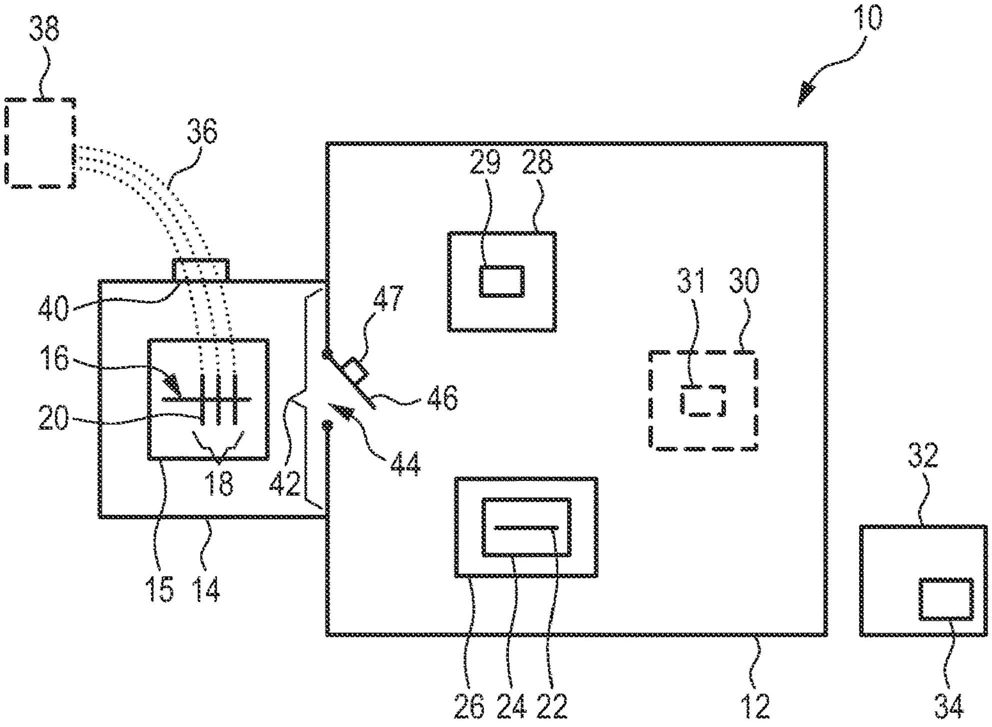
FIG. 1 shows a schematic representation of a first embodiment of a transfer system according to a second aspect of the application.

FIG. 1 shows a schematic representation 10 of a first embodiment of a transfer system 10 according to a second aspect of the application.

The transfer system 10 of the first embodiment has an isolator 12, in particular an aseptic isolator 12, with a transfer lock 14. Within the transfer lock 14, a first needle carrier 16 can be arranged which carries a number of filling needles 18, wherein at least one filling needle 20 of the number of filling needles 18 preferably has a circular cylindrical shape (see also FIG. 5A and FIG. 5B). However, a filling needle shape is not limited to circular cylindrical shapes. Alternatively, other common filling needle shapes (e.g. triangular, elliptical, polygonal shapes or the like) are also possible.

In addition, a second needle carrier 22 can be arranged in a first position 24 within the aseptic isolator 12. The second needle carrier 22 is preferably arranged in a filling station 26 in which objects or end containers (e.g. vials, carpules, bottles, syringes and/or the like) are filled with a fluid, in particular a pharmaceutical or cosmetic fluid, by means of the at least one filling needle 20 of the number of filling needles 18.

Furthermore, the transfer system 10 of the first embodiment has at least one robot 28 with at least one robot end effector 29. The at least one robot 28 has a support structure, in particular an articulated support structure (not shown), at the end of which a robot end effector is arranged. The support structure is configured to move the robot end effector in all three spatial directions. Alternatively, two or more, preferably identical, robots 28 can also be arranged within the isolator 12. For example, a first robot 28 with at least one first robot end effector 29 can be arranged closer to the transfer lock 14, whereas an optional second robot 30 with at least one second robot end effector 31 can be arranged closer to the second needle carrier 22 (or the filling station 26). The robot end effector 29 is configured to hold at least one filling needle directly. As has been mentioned at the outset, the at least one filling needle can be held, for example, mechanically, in particular by form-fit or force-fit engagement, or magnetically. For example, the at least one filling needle can be held in a robot-assisted manner by means of a releasable clip connection. The robot end effector 29 preferably has one or more grippers 56, 58 which permit targeted gripping of at least one filling needle 20 (shown by way of example in FIG. 5A). In addition, the at least one robot 28 can be controlled by a controller 32 which has a computer program 34 with a program code. In FIG. 1, the controller 32 is shown as an independent, separate unit. Alternatively, however, the controller 32 can also be integrated into the aseptic isolator 12.

Optionally, the number of filling needles 18 can be fluidically connected, by means of a number of tubes 36, to a source container 38, which preferably contains a pharmaceutical or cosmetic fluid. In order to maintain the sterile environment within the aseptic isolator 12, the transfer lock 14 is preferably configured in such a way that the number of tubes 36 cross through a wall 40 of the transfer lock 14 in a sterile manner, for example through appropriate sealing means. A conveying means (e.g. at least one pump) for conveying the fluid is preferably arranged between the number of filling needles and the source container. This conveying means can be, for example, a peristaltic pump, a rotary piston pump or the like.

As is shown in FIG. 1, the aseptic isolator 12 and the transfer lock 14 share a common wall portion 42. Extending through the common wall portion 42 is an opening 44, which corresponds to the alpha port explained above. Furthermore, the aseptic isolator 42 has a door 46 which is configured to releasably lock the opening 44. In FIG. 1, the door 46 is shown as being pivotable, for example. Alternatively, however, the door 46 can also be configured as a sliding door, which represents a space-saving alternative to the pivoting door. With such an alpha-beta port, the inventive transfer of the at least one filling needle 20 of the number of filling needles 18 into the aseptic isolator 12 can take place while a sterile environment is maintained within the transfer lock 14 and within the aseptic isolator 12. The door 46 can preferably be opened and/or closed by means of the robot end effector 29. Optionally, glove ducts (not shown) in the aseptic isolator 12 can also be provided for this purpose.

In the transfer system 10 of the first embodiment, a method 100 according to a first embodiment of the first aspect of the application can be carried out.

In a first step 102 of the method 100, the first needle carrier 16, which carries the number of filling needles 18, is provided within the transfer lock 14. The number of filling needles 18 is arranged in the first needle carrier 16. The first needle carrier 16, together with the number of filling needles 18 arranged therein, is arranged in the transfer lock 14, which is configured, for example, as a sterile bag or as a rigid transport container, before the transfer lock 14 is coupled in a sterile manner to the alpha port of the aseptic isolator 14. The number of filling needles 18 can be arranged in a regular or irregular arrangement in the first needle carrier 16. A regular arrangement can be, for example, a linear regular arrangement (e.g. in the form of a matrix) or a circular regular arrangement (e.g. in the form of a circular pattern).

In a further step 104, the second needle carrier 22 is provided in the first position 24 within the aseptic isolator 12. The second needle carrier 22 is preferably introduced into the aseptic isolator 12 in a pre-sterilized state and accordingly arranged in the first position 24 with robot assistance or manually. The second needle carrier 22 can, for example, be introduced into the aseptic isolator 12 in a sterile manner via the opening 44.

Furthermore, the second needle carrier 22 has receptacles (e.g. through-holes) for carrying at least one filling needle 20. Such receptacles can, for example, be identical to the receptacles of the first needle carrier 16, so that, for example, filling needle spacings and/or a filling needle arrangement of the first needle carrier 16 and of the second needle carrier 22 are identical. Alternatively, the receptacles of the needle carrier 16 and those of the needle carrier 22 can be different. It is also possible, for example, that the first needle carrier 16 can carry more filling needles than the second needle carrier 22.

In a further step 106, at least one filling needle 20 of the number of filling needles 18 is transferred from the first needle carrier 16 to the second needle carrier 22 with robot assistance.

In a preferred embodiment, the step 106 takes place in such a way that the robot end effector 29 removes the at least one filling needle 20 of the number of filling needles 18 collectively and/or at the same time from the first needle carrier 16 and transfers it to the second needle carrier 22. The at least one filling needle 20 is gripped directly and removed from the first needle carrier. The collective transfer of the at least one filling needle 20 proves to be particularly advantageous when the first needle carrier 16 and the second needle carrier 22 are substantially identical, i.e. have the same filling needle spacings and the same filling needle arrangement.

In an alternative preferred embodiment, the step 106 takes place in such a way that the robot end effector 29 removes the at least one filling needle 20 of the number of filling needles 18 individually and transfers it to the second needle carrier 22. The at least one filling needle 20 is held directly by means of the robot end effector 29. The individual transfer of the at least one filling needle 20 proves to be particularly advantageous when the first needle carrier 16 and the second needle carrier 22 differ in respect of the filling needle spacings and/or the filling needle arrangement.

In an optional step, which is preferably carried out before the first step 106, the transfer lock 14 can be opened with robot assistance, i.e. by means of the robot end effector 29. For this purpose, the door 46 can, for example, have a counter-receptacle 47, in particular of a circular cylindrical shape, which can be engaged by the robot end effector 29 or otherwise gripped. In this way, the degree of automation of the method 100 can be further increased.

In a further step 108, the at least one filling needle 20 is arranged in the second needle carrier 22 with robot assistance. Meanwhile, the at least one filling needle 20 of the number of filling needles 18 is held directly by means of the robot end effector 29. As has already been mentioned, the needle carrier 22 can be in the first position 24 in a filling station 26 in which objects are filled with a fluid, in particular a pharmaceutical or a cosmetic fluid, by means of the at least one filling needle 20 of the number of filling needles 18. In this case, the objects are preferably positioned directly below the at least one filling needle 20.

Figure 2:
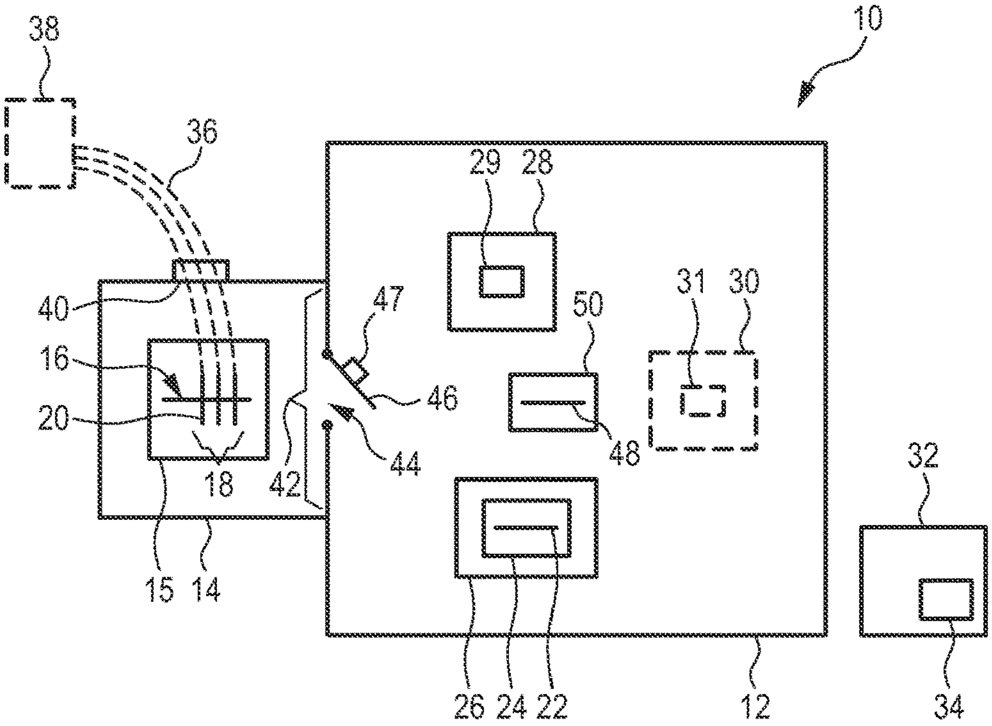
FIG. 2 shows a schematic representation of a second embodiment of the transfer system according to the second aspect of the application.

FIG. 2 shows a schematic representation of a second embodiment of the transfer system 10 according to the second aspect of the application.

The transfer system 10 of the second embodiment corresponds substantially to the transfer system 10 of the first embodiment. The same elements are identified by the same reference signs and are not explained in detail. The transfer system 10 of the second embodiment differs from the transfer system 10 of the first embodiment in that it has a third needle carrier 48, which can be arranged in a second position 50 within the aseptic isolator 12. The second position 50 is spaced apart from the first position 24. The third needle carrier 48 is preferably an intermediate carrier in which the at least one filling needle 20 is carried before it is transferred to the second needle carrier 22.

In the transfer system 10 of the second embodiment, a method 100' according to a second embodiment of the first aspect of the application can be carried out.

In a first step 102 of the method 100', the first needle carrier 16, which carries the number of filling needles 18, is provided within the transfer lock 14. The number of filling needles 18 is arranged in the first needle carrier 16. The first needle carrier 16, together with the number of filling needles 18 arranged therein, is arranged in the transfer lock 14, which is configured, for example, as a sterile bag or as a rigid transport container, before the transfer lock 14 is coupled in a sterile manner to the alpha port of the aseptic isolator 14. The number of filling needles 18 can be arranged in a regular or irregular arrangement in the first needle carrier 16. A regular arrangement can be, for example, a linear regular arrangement (e.g. in the form of a matrix) or a circular regular arrangement (e.g. in the form of a circular pattern).

In a further step 104, the second needle carrier 22 is provided in the first position 24 within the aseptic isolator 12. The second needle carrier 22 is preferably introduced into the aseptic isolator 12 in a pre-sterilized state and is accordingly arranged in the first position 24 with robot assistance or manually. The second needle carrier 22 can, for example, be introduced into the aseptic isolator 12 in a sterile manner via the opening 44.

Furthermore, the second needle carrier 22 has receptacles (e.g. through-holes) for carrying at least one filling needle 20. Such receptacles can, for example, be identical to the receptacles of the first needle carrier 16, so that, for example, filling needle spacings and/or a filling needle arrangement of the first needle carrier 16 and of the second needle carrier 22 are identical. Alternatively, the receptacles of the needle carrier 16 and of the needle carrier 22 can be different. It is also possible, for example, that the first needle carrier 16 can carry more filling needles than the second needle carrier 22.

In a further step 106 of the method 100', at least one filling needle 20 of the number of filling needles 18 is transferred from the first needle carrier 16 to the second needle carrier 22 with robot assistance.

In a first step 110, the at least one filling needle 20 of the number of filling needles 18 is initially transferred from the first needle carrier 16 to the third needle carrier 48 with robot assistance. The at least one filling needle 20 is held directly by means of the robot end effector and can be transferred either collectively or individually from the first needle carrier 16 to the third needle carrier 48. In a further step 112, the at least one filling needle 20 of the number of filling needles 18 gripped in step 110 is placed in the third needle carrier 48 with robot assistance.

In a further step 108, the at least one filling needle 20 is arranged in the second needle carrier 22 with robot assistance. Meanwhile, the at least one filling needle 20 of the number of filling needles 18 is held directly by means of the robot end effector 29. As has already been mentioned, the needle carrier 22 can be in the first position 24 in a filling station 26 in which objects are filled with a fluid, in particular a pharmaceutical or a cosmetic fluid, by means of the at least one filling needle 20 of the number of filling needles 18. In this case, the objects are preferably positioned directly below the at least one filling needle 20.

The step 108 takes place by means of a second robot-assisted transfer 114 of the at least one filling needle 20 of the number of filling needles 18 from the third needle carrier 48 to the second needle carrier 22, wherein the at least one filling needle 20 of the number of filling needles 18 is held directly during the second robot-assisted transfer 114.

If the at least one filling needle 20 of the number of filling needles 18 is transferred collectively from the first needle carrier 16 to the third needle carrier 48, the at least one filling needle 20 of the number of filling needles 18 is individually transferred from the third needle carrier 48 to the second needle carrier 22. This embodiment is advantageous, for example, when the first needle carrier 16 and the third needle carrier 48 are substantially identical, the third needle carrier 48 and the second needle carrier 22 differing in terms of the filling needle spacing and/or the filling needle arrangement.

If, by contrast, the at least one filling needle 20 of the number of filling needles 18 is transferred individually from the first needle carrier 16 to the third needle carrier 48, the at least one filling needle 20 of the number of filling needles 18 is transferred collectively from the third needle carrier 48 to the second needle carrier 22. This embodiment is advantageous, for example, when the third needle carrier 48 and the second needle carrier 22 do not differ in respect of the filling needle spacings and/or the filling needle arrangement (i.e. are substantially identical), the first needle carrier 16 and the third needle carrier 48 differing in terms of the filling needle spacings and/or the filling needle arrangement.

In an optional step, which is preferably carried out before the first step 106, the transfer lock 14 can be opened with robot assistance, i.e. by means of the robot end effector 29. For this purpose, the door 46 can, for example, have a counter-receptacle 47, in particular of a circular cylindrical shape, which can be engaged by the robot end effector 29 or otherwise gripped. In this way, the degree of automation of the method 100 can be further increased.

Figure 3:
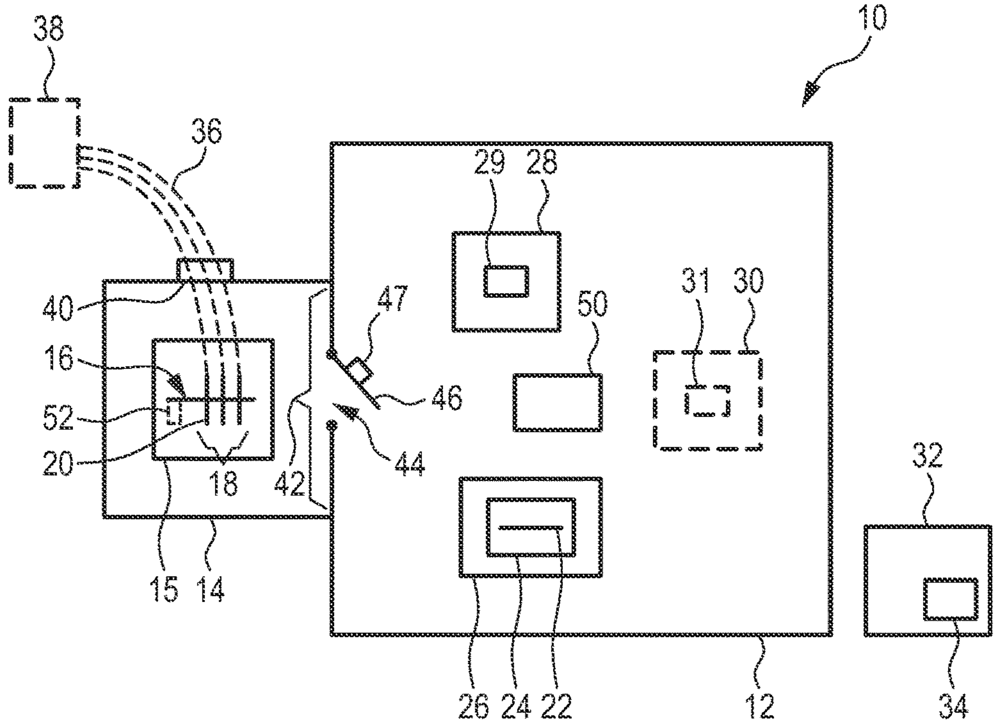
FIG. 3 shows a schematic representation of a third embodiment of the transfer system according to the second aspect of the application.

FIG. 3 shows a schematic representation of a third embodiment of the transfer system 10 according to the second aspect of the application.

The transfer system 10 of the third embodiment corresponds substantially to the transfer system 10 of the first embodiment. The same elements are identified by the same reference signs and are not explained in detail. The transfer system 10 of the third embodiment differs from the transfer system 10 of the first embodiment in terms of the optional configuration of the first needle carrier 16.

In contrast to the transfer system 10 of the first embodiment, the first needle carrier 16 according to the transfer system 10 of the third embodiment (optional) can have at least one projection 52. The at least one projection 52 preferably extends from a base body 62 of the first needle carrier 16. Each of the at least one projection 52 is shaped in such a way that a robot gripper 56 (shown by way of example in FIGS. 5A and 5B) of a robot end effector 29, which is configured to receive or hold a single filling needle 20 of the number of filling needles 18 or an object to be filled by means of the single filling needle 20 of the number of filling needles 18, in particular a pharmaceutical or cosmetic object, can receive or hold said projection. Each of the at least one projection 52 can have a circular cylindrical shape, for example. However, the shape of the projection is not limited to circular cylindrical shapes. Other shapes (e.g. prismatic or triangular, rectangular or cuboid or the like) are also possible. It goes without saying that the robot end effector 29 can, for example, have a plurality of grippers 56, 58, each of which can grip "a single" filling needle 20 of the number of filling needles 18 (e.g. shown in FIG. 5A).

Alternatively, however, the first needle carrier 16 can also be formed without such a projection 52.

In the transfer system 10 of the third embodiment, a method 100" according to a third embodiment of the first aspect of the application can be carried out.

In a first step 102 of the method 100", the first needle carrier 16, which carries the number of filling needles 18, is provided within the transfer lock 14. The number of filling needles 18 is arranged in the first needle carrier 16. The first needle carrier 16, together with the number of filling needles 18 arranged therein, is arranged in the transfer lock 14, which is configured, for example, as a sterile bag or as a rigid transport container, before the transfer lock 14 is coupled in a sterile manner to the alpha port of the aseptic isolator 14. The number of filling needles 18 can be arranged in a regular or irregular arrangement in the first needle carrier 16. A regular arrangement can be, for example, a linear regular arrangement (e.g. in the form of a matrix) or a circular regular arrangement (e.g. in the form of a circular pattern).

In a further step 104, the second needle carrier 22 is provided in the first position 24 within the aseptic isolator 12. The second needle carrier 22 is preferably introduced into the aseptic isolator 12 in a pre-sterilized state and is accordingly arranged in the first position 24 with robot assistance or manually. The second needle carrier 22 can, for example, be introduced into the aseptic isolator 12 in a sterile manner via the opening 44.

Furthermore, the second needle carrier 22 has receptacles (e.g. through-holes) for carrying at least one filling needle 20. Such receptacles can, for example, be identical to the receptacles of the first needle carrier 16, so that, for example, filling needle spacings and/or a filling needle arrangement of the first needle carrier 16 and of the second needle carrier 22 are identical. Alternatively, the receptacles of the first needle carrier 16 and of the second needle carrier 22 can be different. It is also possible that the first needle carrier 16 can carry more filling needles than the second needle carrier 22.

In a further step 106, at least one filling needle 20 of the number of filling needles 18 is transferred from the first needle carrier 16 to the second needle carrier 22 with robot assistance. The needle carrier 16 can be picked up via the at least one projection 52, for example with robot assistance.

In a first step 116, the first needle carrier 16, together with the number of filling needles 18, is transferred from the transfer lock 14 to a second position 50 within the aseptic isolator 12 with robot assistance, the second position 50 being spaced apart from the first position 22. In a further step 118, the first needle carrier 16 from step 116 is arranged in the second position 50.

In a further step 108, the at least one filling needle 20 is arranged in the second needle carrier 22 with robot assistance. Meanwhile, the at least one filling needle 20 of the number of filling needles 18 is held directly. As has already been mentioned, the needle carrier 22 can be in the first position 24 in a filling station 26 in which objects are filled with a fluid, in particular a pharmaceutical or a cosmetic fluid, by means of the at least one filling needle 20 of the number of filling needles 18. In this case, the objects are preferably positioned directly below the at least one filling needle 20.

The step 108 is carried out by means of a second robot-assisted transfer 120 of the at least one filling needle 20 of the number of filling needles 18 from the first needle carrier 16, which is arranged in position 50 at this time, to the second needle carrier 22, wherein the at least one filling needle 20 of the number of filling needles 18 is held directly during the second robot-assisted transfer 120. In other words, the step of second transfer 120 takes place starting from the first needle carrier 16 arranged in the second position 50. The at least one filling needle 20 of the number of filling needles 18 can be transferred collectively or individually from the first needle carrier 16, arranged in the second position 50, to the second needle carrier 22.

In an optional step, which is preferably carried out before the first step 106, the transfer lock 14 can be opened with robot assistance, i.e. by means of the robot end effector 29. For this purpose, the door 46 can, for example, have a counter-receptacle 47, in particular of a circular cylindrical shape, which can be engaged by the robot end effector 29 or otherwise gripped. In this way, the degree of automation of the method 100 can be further increased.

Figure 4:
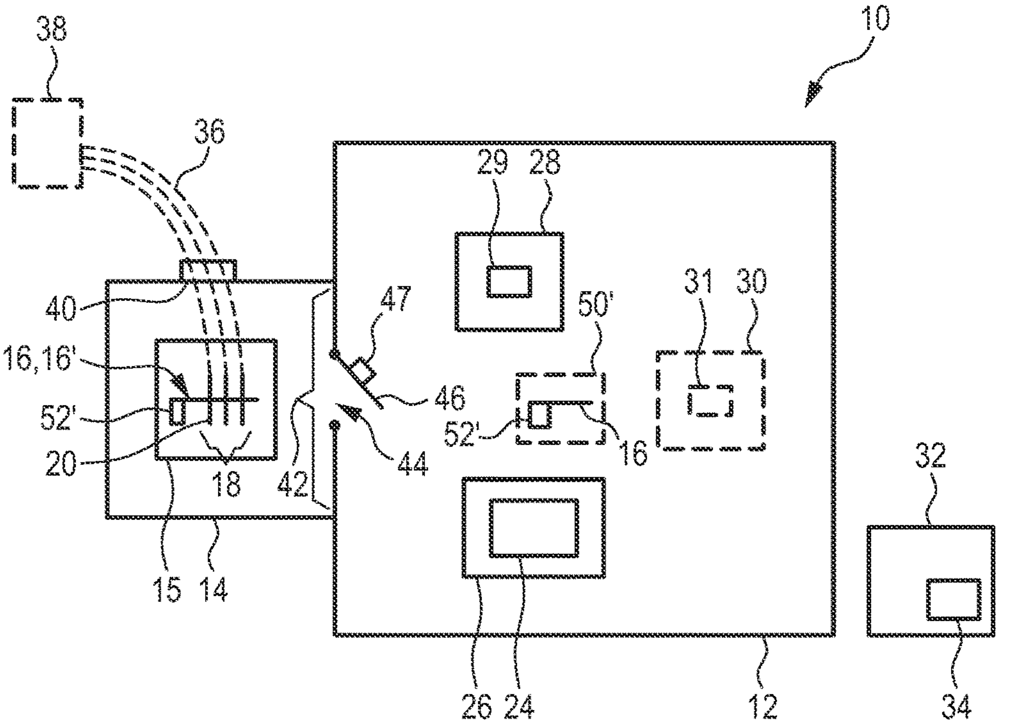
FIG. 4 shows a schematic representation of an embodiment of the transfer system according to a fifth aspect of the application.

FIG. 4 shows a schematic representation of a transfer system 10 according to a fifth aspect of the application.

The transfer system 10' according to the fifth aspect of the application corresponds substantially to the transfer system 10 of the third embodiment of the second aspect of the application. The same elements are identified by the same reference signs and are not explained in detail. A difference from the transfer system 10 of the third embodiment of the second aspect is that the needle carrier 16 according to the transfer system 10' has a receptacle 52'.

In the embodiment of the transfer system 10', a method 200 according to an embodiment of the fourth aspect of the application can be carried out.

In a first step 202 of the method 200, a needle carrier 16 is provided. The needle carrier 16 has a base body 62 for carrying a number of filling needles 18. The number of filling needles 18 can be arranged in the needle carrier 16, in particular in the base body 62. Furthermore, the needle carrier has a receptacle 52'. The receptacle 52' is preferably at least one projection which extends from the base body 62. Each projection of the at least one projection is preferably shaped in such a way that the robot gripper 56, 58 of the robot end effector 29, 31, which is configured to receive a single filling needle 20 or an object, in particular a pharmaceutical or cosmetic object, to be filled by means of the single filling needle 20, can receive said projection.

In a further step 204, the needle carrier 16 is received via the receptacle 52' by means of the robot end effector 29, 31. During the execution of step 204, the needle carrier 16 carries the number of filling needles. The robot end effector 29, 31 is configured to receive both a single filling needle 20 of the number of filling needles 18, or an object, in particular a pharmaceutical or cosmetic object, to be filled by means of the single filling needle 20, and also the at least one projection 52'. The needle carrier can be picked up mechanically, in particular by form-fit or force-fit engagement, or magnetically. For example, the receptacle 52' of the needle carrier 16 can be received in a robot-assisted manner by means of a releasable clip connection. Alternatively, the receptacle 52' can also be gripped by means of a robot gripper. Magnetic picking-up of the needle carrier 16 via the receptacle 52' is also possible.

In a further step 206, the needle carrier 16, received via the receptacle 52', together with the number of filling needles 18, is transferred with robot assistance to a filling position 24 in the aseptic isolator 12.

In a further step 208, the needle carrier 16 is arranged in the filling position 24 within the aseptic isolator 12. The needle carrier 16 arranged in the filling position 24 is preferably in a filling station 26 in which a number of objects are filled with a fluid, in particular a pharmaceutical or a cosmetic fluid, by means of the at least one filling needle 20 of the number of filling needles 18. A carrier for carrying the needle carrier 16 is preferably arranged in the filling position 24, wherein a number of objects to be filled, in particular pharmaceutical or cosmetic objects, are preferably positioned directly below the number of filling needles 18 and assigned to them. Alternatively, the needle carrier in the filling station 26 can also remain in the robot end effector 29, 31. In other words, this means that the needle carrier 16 is held directly in the filling station 26 during the filling of the number of objects.

In one embodiment, the needle carrier 16 with the number of filling needles 18 is provided within the transfer lock 14. In other words, this means that the needle carrier 16 is initially located in the transfer lock 14. Starting from the transfer lock 14, it is picked up with robot assistance via the receptacle 52' and transferred to the filling position 24.

In an alternative embodiment, the needle carrier 16 is provided in a position 50' spaced apart from the filling position 24 within the isolator. Before the step 206 is carried out, a transfer lock needle carrier 16' is provided within the transfer lock 14. The transfer lock needle carrier 16' initially carries the number of filling needles 18. In a further step, which is likewise carried out before the step 206, the number of filling needles 18 is transferred with robot assistance from the transfer lock needle carrier 16' to the needle carrier 16, which is in the position 50'. The number of filling needles 18 is held directly by means of a robot end effector. In a last step, which is carried out before the step 206, the removed number of filling needles 18 is placed in the needle carrier 16 with robot assistance. The number of filling needles can be transferred either individually or collectively from the transfer lock needle carrier 16' to the needle carrier 16.

During the robot-assisted transfer 206, the needle carrier 16 can be transferred by means of more than one robot 28, 30. For example, the needle carrier 16 can be transferred from one robot 28 to a further robot 30.

In an optional step, which is preferably carried out before the first step 206, the transfer lock 14 can be opened with robot assistance, i.e. by means of the robot end effector 29, 31. For this purpose, the door 46 can, for example, have a counter-receptacle 47, in particular of a circular cylindrical shape, which can be engaged by the robot end effector 29 or otherwise gripped. The counter-receptacle 47 is preferably shaped as a circular cylinder. As a result, the degree of automation of the method 100 can be further increased, and an interaction with the robot end effector 29, 31 can be further simplified.

Figure 5A:
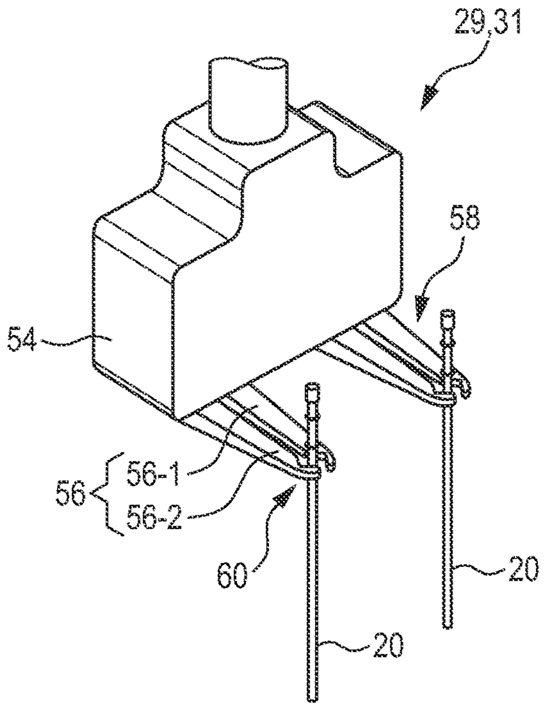
FIG. 5A shows an isometric representation of an embodiment of a robot end effector according to the application, which directly grips a number of filling needles.
Figure 5B:
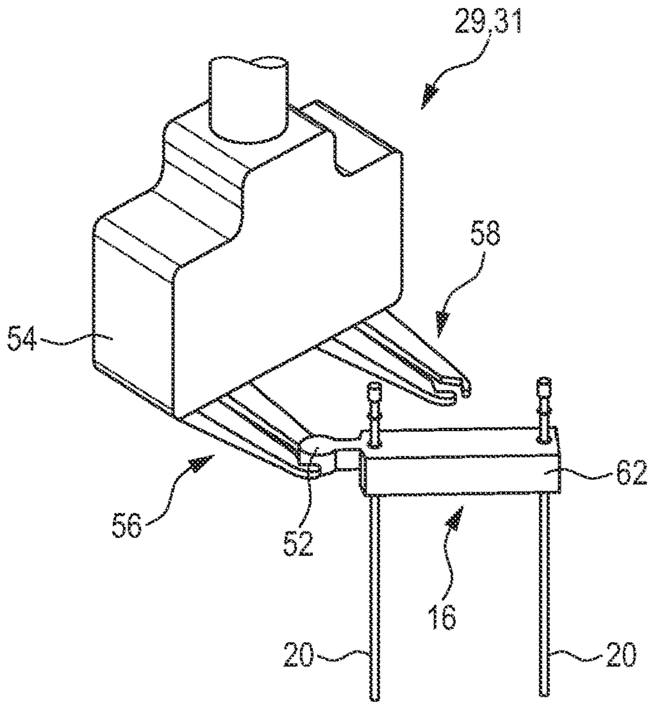
FIG. 5B shows an isometric representation of an embodiment of a robot end effector according to the application, which grips a needle carrier.

FIGS. 5A and 5B show an isometric view of an embodiment of a robot end effector 29, 31 according to the application. The robot end effector 29, 31 is connected to a robot 28, 30 by means of a preferably articulated support structure (not shown). The support structure is configured to move the robot end effector in all three spatial directions and can have one or more joints for this purpose. The support structure can, for example, be a construction with multi-axis movements of any kind. For example, such a construction can have two to six axis movements of any kind.

The robot end effector 29, 31 has a main body 54, a first gripper 56 and a second gripper 58. However, the robot end effector 29, 31 can also have fewer or more grippers. For example, the robot end effector 29, 31 can have only one gripper 56 or more than two grippers 58. In order to minimize the manufacturing effort and the complexity of the end effector 29, 31, the plurality of grippers 56, 58 can be configured identically.

The first gripper 56 has a first leg 56-1 and a second leg 56-2, the first leg 56-1 and the second leg 56-2 being movable relative to each other. The first gripper 56 extends from the main body 54 and has a recess at a gripping portion 60. The recess is configured in such a way that preferably circular cylindrical or tubular elements can be gripped. For example, the recess can be curved, angular or circular-cylindrical in order to center the circular-cylindrical or tubular elements. The same applies to the second gripper 58.

The robot end effector 29, 31 is preferably configured to grip an individual filling needle 20, an object (not shown) to be filled by means of the individual filling needle 20, and/or a needle carrier 16.

Figure 6:
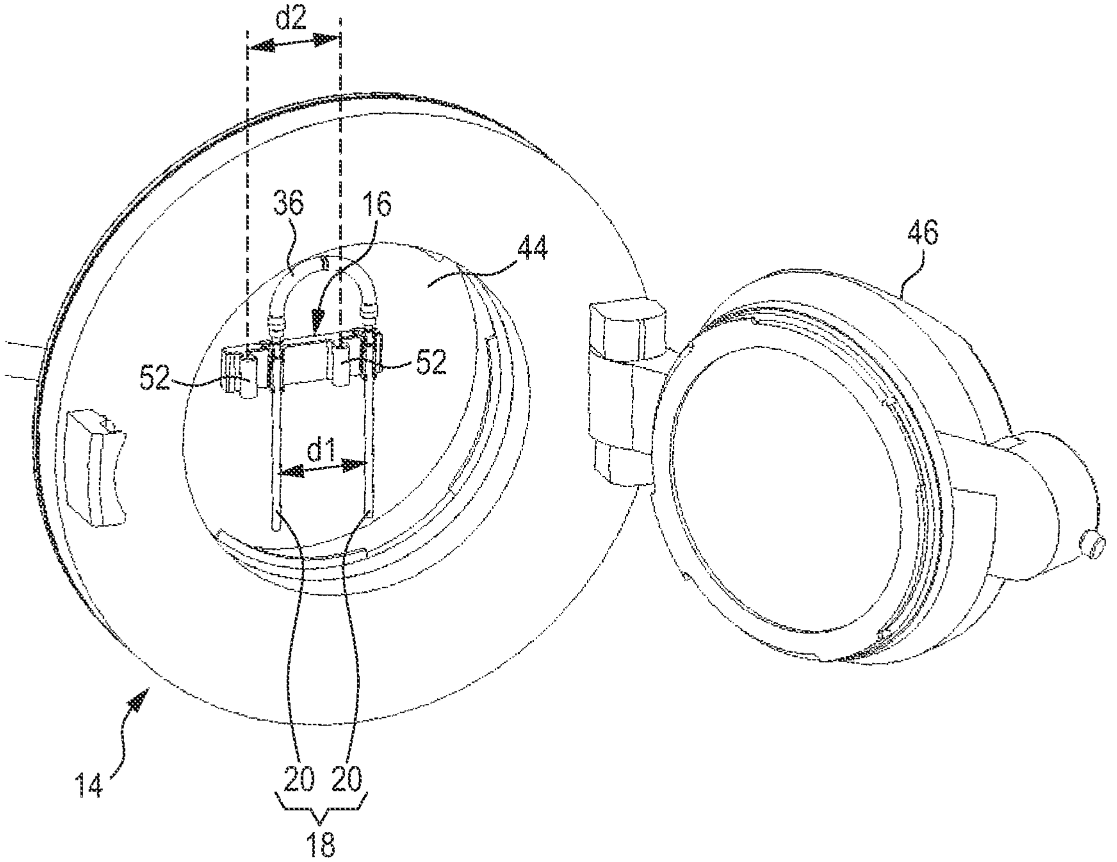
FIG. 6 shows an isometric representation of an embodiment of a needle carrier according to the application in an example of a transfer lock.
Figure 7:
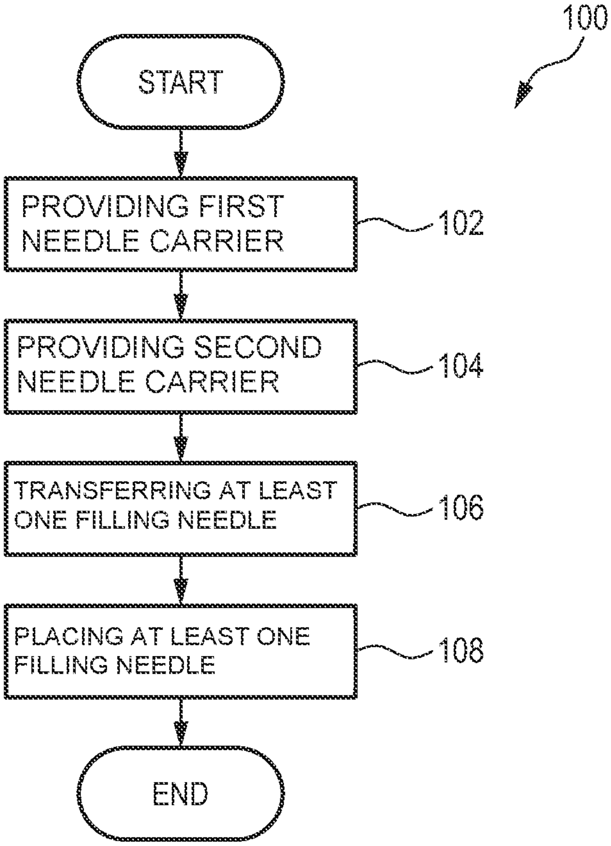
FIG. 7 shows a schematic representation of a first embodiment of the method according to the first aspect of the application.
Figure 8:
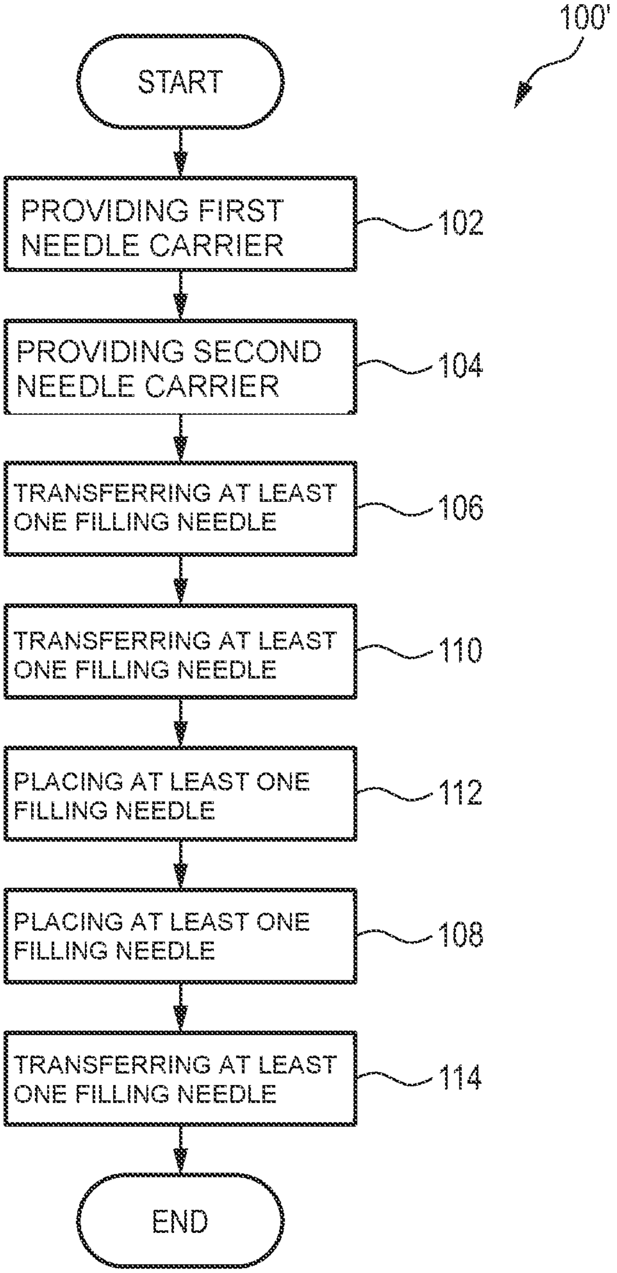
FIG. 8 shows a schematic representation of a second embodiment of the method according to the first aspect of the application.
Figure 9:
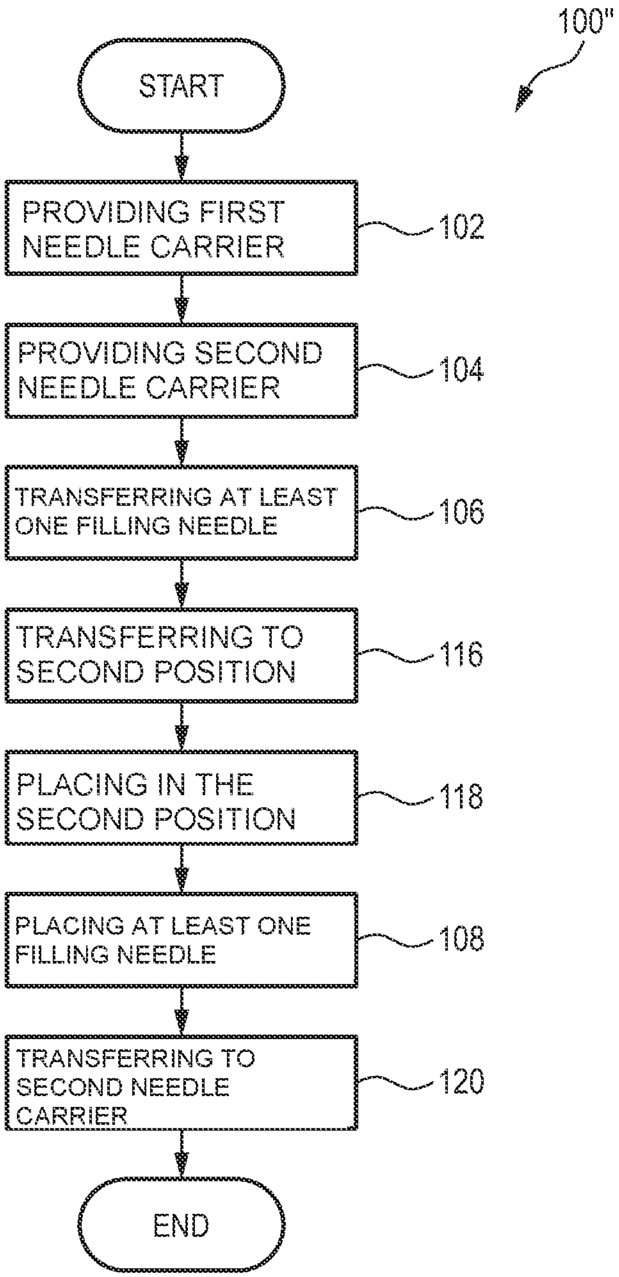
FIG. 9 shows a schematic representation of a third embodiment of the method according to the first aspect of the application.
Figure 10:
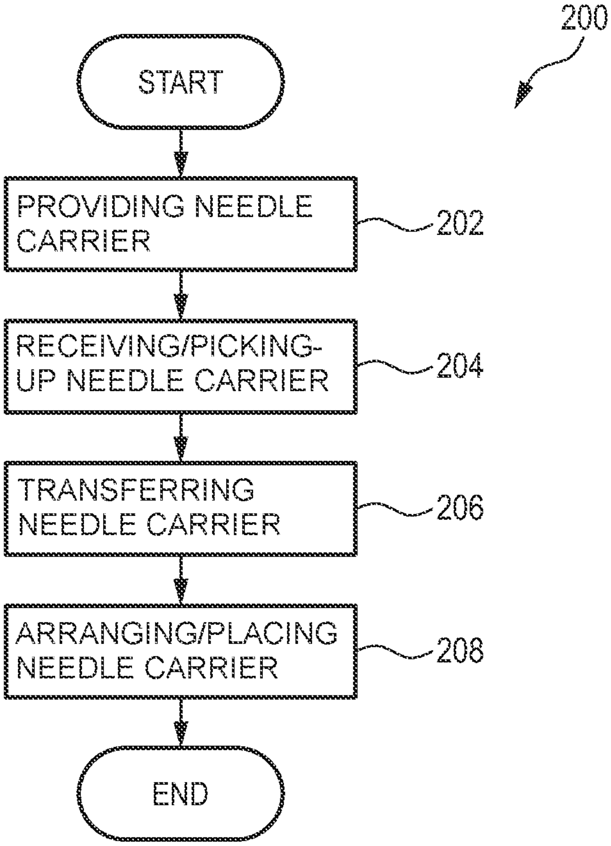
FIG. 10 shows a schematic representation of a method according to the fourth aspect of the application.
Figure 11:
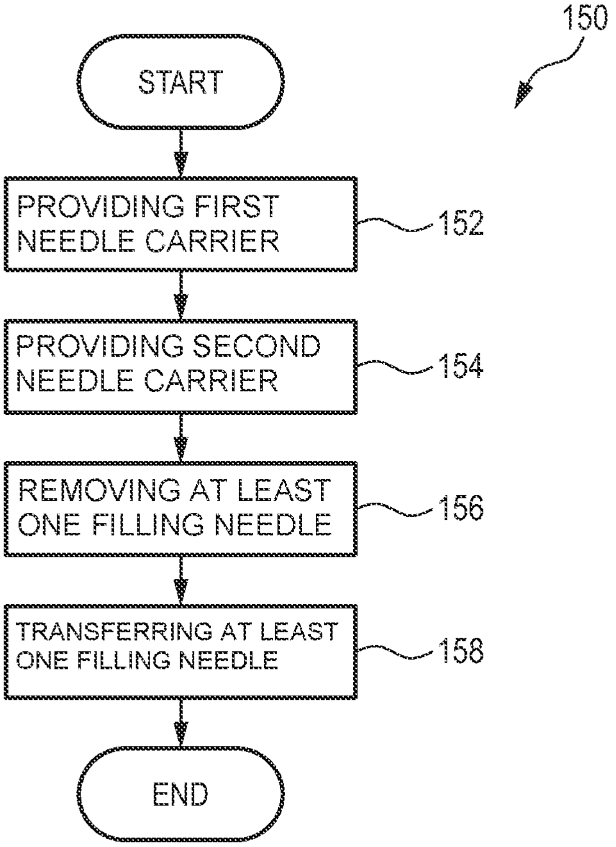
FIG. 11 shows a schematic representation of a method according to a seventh aspect of the application.

FIG. 6 shows an isometric representation of an embodiment of the robot end effector 29, 31 according to the application, which, for example, engages a needle carrier 16 via the preferably circular-cylindrical receptacle 52 by means of the first gripper 56. The receptacle 52 is configured as a projection which extends from a base body 62 of the needle carrier 16. The projection 52 is shaped in such a way that a robot end effector, which is configured to grip a single filling needle of the number of filling needles or an object to be filled by means of the single filling needle, in particular an object for receiving a pharmaceutical or cosmetic fluid or liquid, can also grip the projection. As a rule, such objects have a circular cylindrical shape, so that the cross section to be gripped is circular. Therefore, the projection 52 can likewise have a circular cross section. The needle carrier 16 can then be gripped by the same end effector 29, 31 with which the at least one needle 20 itself can also be gripped. It is therefore possible to avoid changing the end effector 29, 31, even if the transfer process for transferring the at least one filling needle 20 into the aseptic isolator 12 changes. However, the needle carrier according to the application is not limited to one projection. Alternatively, the needle carrier 16 can, for example, have two or more such projections.

FIG. 6 shows an isometric representation of an embodiment of a needle carrier 16 according to the application in a transfer lock (not shown), which in the present example is coupled to the alpha port of the aseptic isolator. The alpha port has a recess 44 and a door 46. The door 46 is attached (in particular pivotably) to the alpha port in such a way that the opening 44 can be releasably locked by the door 46. A needle carrier 16 according to the application is provided within the transfer lock 14. It carries a number of filling needles 18 provided with tubes 36. The number of filling needles can be carried in different ways. For example, the needle carrier 16 can have at least one through-hole for carrying at least one filling needle 20 therein. In principle, however, other types of connection are also conceivable. Optionally, the at least one filling needle 20 can be arranged magnetically in or on the needle carrier 16. It can also be provided that the at least one filling needle is arranged in or on the needle carrier with form-fit engagement (e.g. by means of a clip connection or snap connection).

A difference from the needle carrier shown in FIG. 5B is that the needle carrier 16 shown in FIG. 6 has, for example, two projections 52. However, the number of projections 52 can also be more than two. In this way, it is possible to ensure additional securing of the needle carrier against rotation when it is picked up with robot assistance. A corresponding robot end effector 29, 31 preferably has a number of robot grippers 56, 58 (FIGS. 5A and 5B) corresponding to the number of projections 52, by means of which robot grippers the number of projections 52 can be received, in particular simultaneously. In a preferred embodiment of the needle carrier shown in FIG. 6, a filling needle spacing d1 (i.e. a spacing between adjacent filling needles 20) corresponds to a spacing d2 between adjacent projections 52. Optionally, the spacing between two adjacent robot grippers 56, 58 can also correspond to the spacing d1 and/or d2. It goes without saying that the illustrated embodiment of the needle carrier is not limited to the first needle carrier (i.e. the transfer lock needle carrier), but can also be an embodiment of the second and/or third needle carrier.

The method 150 according to the seventh aspect of the application can be carried out complementarily to the method according to the first aspect of the application. For example, the method according to the seventh aspect of the application can be understood as a reversion of the method according to the first aspect of the application.

Alternatively, however, the method 150 according to the seventh aspect of the application can also be carried out independently of the method according to the first aspect of the application.

The method 150 according to the seventh aspect of the application can be carried out in the system 10 described above (see FIG. 1 to FIG. 3).

In a first step 152 of the method 150, the first needle carrier 16 is provided. The first needle carrier 16 can be arranged in the transfer lock 14, for example. As is shown for example in the embodiment according to FIG. 3, the first needle carrier 16 can also be arranged in the second position 50.

In a further step 154, the second needle carrier 22 is provided in the first position 24 within the isolator 12. The second needle carrier 22 preferably carries the number of filling needles 18.

In a further step 156, at least one filling needle 20 of the number of filling needles 18 is removed from the second needle carrier 22. The at least one filling needle 20 of the number of filling needles 18 is held directly by the robot end effector 29, 31 during the robot-assisted removing 108.

In a further step 158, the at least one filling needle 20 of the number of filling needles 18 is transferred from the second needle carrier 16 to the first needle carrier 22 with robot assistance.

In an optional step, the transfer lock 14 can be closed with robot assistance, i.e. by means of the robot end effector 29, 31, via the counter-receptacle 47 of the door 46.

Figure 12:
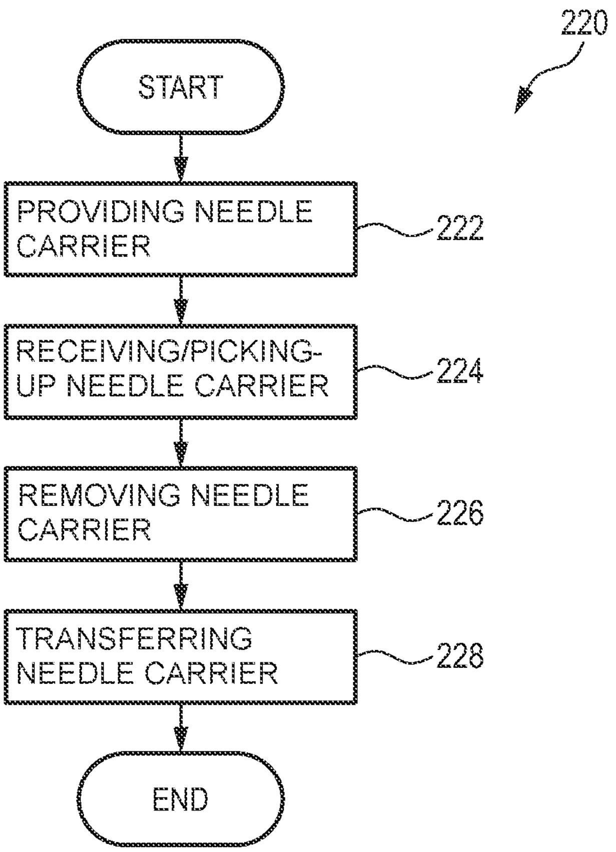
FIG. 12 shows a schematic representation of a method according to a tenth aspect of the application.

FIG. 12 shows a schematic representation of a method 220 according to a tenth aspect of the application.

The method 220 according to the tenth aspect of the application can be carried out complementarily to the method according to the fourth aspect of the application. For example, the method according to the tenth aspect of the application can be understood as a reversion of the method according to the fourth aspect of the application.

Alternatively, however, the method 220 according to the tenth aspect of the application can also be carried out independently of the method according to the fourth aspect of the application.

The method 220 according to the tenth aspect of the application can be carried out in the system 10' described above (see FIG. 4).

In a first step 222, the needle carrier 16 is provided in the filling position 24.

In a further step 224, the needle carrier 16 is picked up via the receptacle 52 in a robot-assisted manner. The needle carrier 16 preferably carries the number of filling needles 18. In a further step 226, the needle carrier 16 is removed from the filling position 24 in the isolator 12.

In a further step 228, the needle carrier 16 with the number of filling needles 18 is transferred from the filling position. In an optional step, the transfer lock 14 can be closed with robot assistance, i.e. by means of the robot end effector 29, 31, via the counter-receptacle 47 of the door 46.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for transferring at least one filling needle of a number of filling needles into an isolator which has a transfer lock, the method having the following steps:

providing of a first needle carrier within the transfer lock, said needle carrier carrying the number of filling needles;

providing of a second needle carrier in a first position within the isolator;

robot-assisted transferring of the at least one filling needle of the number of filling needles from the first needle carrier to the second needle carrier; and robot-assisted placing of the at least one filling needle of the number of filling needles in the second needle carrier, wherein the at least one filling needle of the number of filling needles is held directly during the robot-assisted placing;

the number of filling needles are fluidically connected, by means of a number of tubes, to a source container and/or to a conveying means for conveying the fluid; and the number of tubes cross through a wall of the transfer lock in a sterile manner.

2. The method as claimed in claim 1, wherein the second needle carrier is in a filling station in which objects are filled with a fluid by means of the at least one filling needle of the number of filling needles.

3. The method as claimed in claim 1, wherein the at least one filling needle of the number of filling needles is transferred collectively from the first needle carrier to the second needle carrier.

4. The method as claimed in claim 1, wherein the at least one filling needle of the number of filling needles is transferred individually from the first needle carrier to the second needle carrier.

5. The method as claimed in claim 1, wherein the step of robot-assisted transferring of the at least one filling needle of the number of filling needles from the first needle carrier to the second needle carrier comprises the following steps:

first robot-assisted transferring of the at least one filling needle of the number of filling needles from the first needle carrier to a third needle carrier, which is arranged in a second position within the isolator, wherein the second position is spaced apart from the first position;

robot-assisted placing of the at least one filling needle of the number of filling needles in the third needle carrier; and wherein the step of robot-assisted placing of the at least one filling needle of the number of filling needles in the second needle carrier comprises the following step:

second robot-assisted transferring of the at least one filling needle of the number of filling needles from the third needle carrier to the second needle carrier, wherein the at least one filling needle of the number of filling needles is held directly during the second robot-assisted transferring.

6. The method as claimed in claim 5, wherein the third needle carrier is an intermediate carrier in which the at least one filling needle is carried before it is transferred to the second needle carrier.

7. The method as claimed in claim 5, wherein the at least one filling needle of the number of filling needles is transferred collectively from the first needle carrier to the third needle carrier.

8. The method as claimed in claim 5, wherein the at least one filling needle of the number of filling needles is transferred individually from the first needle carrier to the third needle carrier.

9. The method as claimed in claim 5, wherein, when the at least one filling needle of the number of filling needles is transferred collectively from the first needle carrier to the third needle carrier, the at least one filling needle of the number of filling needles is transferred individually from the third needle carrier to the second needle carrier.

10. The method as claimed in claim 5, wherein, when the at least one filling needle of the number of filling needles is transferred individually from the first needle carrier to the third needle carrier, the at least one filling needle of the number of filling needles is transferred collectively from the third needle carrier to the second needle carrier.

11. The method as claimed in claim 1, wherein the step of robot-assisted transferring of the at least one filling needle of the number of filling needles from the first needle carrier to the second needle carrier comprises the following steps:

first robot-assisted transferring of the first needle carrier together with the number of filling needles from the transfer lock to a second position within the isolator, the second position being spaced apart from the first position;

robot-assisted placing of the first needle carrier in the second position; and wherein the step of robot-assisted placing of the at least one filling needle of the number of filling needles in the second needle carrier comprises the following step:

second robot-assisted transferring of the at least one filling needle of the number of filling needles from the first needle carrier to the second needle carrier, wherein the at least one filling needle of the number of filling needles is held directly during the second robot-assisted transferring.

12. The method as claimed in claim 11, wherein the at least one filling needle of the number of filling needles is transferred collectively from the first needle carrier, arranged in the second position, to the second needle carrier.

13. The method as claimed in claim 11, wherein the at least one filling needle of the number of filling needles is transferred individually from the first needle carrier, arranged in the second position, to the third needle carrier.

14. The method as claimed in claim 11, wherein the first needle carrier has a base body, for carrying the number of filling needles, and at least one projection, the at least one projection extending from the base body and having a circular cylindrical shape.

15. The method as claimed in claim 14, wherein each of the at least one projection is shaped in such a way that a robot gripper of a robot end effector, which is configured to grip a single filling needle of the number of filling needles or an object that is to be filled by means of the single filling needle of the number of filling needles can receive said projection.

16. The method as claimed in claim 1, further comprising the step:

robot-assisted opening of the transfer lock before the step of robot-assisted transferring of the at least one filling needle of the number of filling needles from the first needle carrier to the second needle carrier.

17. A method for transferring a number of filling needles to a filling position within an isolator which has a transfer lock, the method comprising the following steps:

providing of a needle carrier, the needle carrier having a base body, for carrying the number of filling needles, and a receptacle;

robot-assisted picking-up of the needle carrier via the receptacle, the needle carrier carrying the number of filling needles;

robot-assisted transferring of the needle carrier with the number of filling needles to the filling position within the isolator; and robot-assisted placing of the needle carrier in the filling position within the isolator;

wherein the needle carrier arranged in the filling position is in a filling station in which a number of objects are filled with a fluid by means of the number of filling needles;

the needle carrier is held directly in the filling station during the filling of the number of objects;

the number of filling needles are fluidically connected, by means of a number of tubes, to a source container and/or to a conveying means for conveying the fluid; and the number of tubes cross through a wall of the transfer lock in a sterile manner.

18. The method as claimed in claim 17, wherein the needle carrier with the number of filling needles is provided within the transfer lock.

19. The method as claimed in claim 17, wherein the needle carrier is provided in a position spaced apart from the filling position within the isolator, wherein the method, prior to the step of robot-assisted transferring, comprises the following steps:

providing of a transfer lock needle carrier within the transfer lock, the transfer lock needle carrier carrying the number of filling needles;

robot-assisted transferring of the number of filling needles from the transfer lock needle carrier to the needle carrier;

robot-assisted placing of the number of filling needles in the needle carrier, wherein the number of filling needles is held directly during the robot-assisted transferring to the needle carrier.

20. The method as claimed in claim 17, wherein, during the robot-assisted transferring, the needle carrier is transferred by means of more than one robot, wherein the needle carrier is passed from one robot to a further robot.

21. The method as claimed in claim 17, wherein the receptacle is at least one projection which extends from the base body, wherein each projection of the at least one projection is shaped in such a way that a robot gripper of a robot end effector, which is configured to receive a single filling needle of the number of filling needles or an object to be filled by means of the single filling needle can receive said projection.

22. The method as claimed in claim 21, wherein each projection of the at least one projection has a circular cylindrical shape.

23. The method as claimed in claim 17, wherein the robot-assisted picking-up of the needle carrier via the receptacle is carried out by means of a clip connection.

24. The method as claimed in claim 17, wherein the robot-assisted picking-up of the needle carrier via the receptacle is carried out by means of a magnetic connection.

25. The method as claimed in claim 17, further comprising the step: of robot-assisted opening of the transfer lock before the needle carrier is received via the receptacle.

26. The method as claimed in claim 17, wherein the providing step further comprises providing of a needle carrier that includes a number of through-holes, each through-hole carries one of the number of filling needles.

27. The method as claimed in claim 17, wherein the providing step further comprises providing of a needle carrier that magnetically holds each of the number of filling needles with magnetic engagement.

28. The method as claimed in claim 17, wherein the providing step further comprises providing of a needle carrier that mechanically holds each of the number of filling needles with form-fit or force-fit engagement.

29. A transfer system for transferring at least one filling needle of a number of filling needles into an isolator, the transfer system comprising:

an isolator, which has a transfer lock, wherein a first needle carrier, which carries the number of filling needles, is provided within the transfer lock, and wherein a second needle carrier is provided in a first position within the isolator;

at least one robot with a robot end effector which is arranged within the isolator; and a controller which is configured in such a way that the following steps are carried out:

robot-assisted transferring of the at least one filling needle of the number of filling needles from the first needle carrier to the second needle carrier; and robot-assisted placing of the at least one filling needle of the number of filling needles in the second needle carrier;

wherein the at least one filling needle of the number of filling needles is held directly by the robot end effector during the robot-assisted placing;

the second needle carrier is arranged in a filling station in which a number of objects are filled with a fluid by means of the number of filling needles;

the second needle carrier is held directly in the filling station during the filling of the number of objects;

the number of filling needles are fluidically connected, by means of a number of tubes, to a source container and/or to a conveying means for conveying the fluid; and the number of tubes cross through a wall of the transfer lock in a sterile manner.

30. A transfer system for transferring a number of filling needles to a filling position within an isolator, the transfer system having:

an isolator, which has a transfer lock;

a needle carrier, wherein the needle carrier has a base body, for carrying the number of filling needles, and a receptacle;

at least one robot with a robot end effector which is arranged within the isolator; and a controller which is configured in such a way that the following steps are carried out:

robot-assisted picking-up of the needle carrier via the receptacle, wherein the needle carrier carries the number of filling needles;

robot-assisted transferring of the needle carrier with the number of filling needles to the filling position within the isolator; and robot-assisted placing of the needle carrier in the filling position within the isolator;

wherein the needle carrier arranged in the filling position is in a filling station in which a number of objects are filled with a fluid by means of the number of filling needles;

the needle carrier is held directly in the filling station during the filling of the number of objects;

the number of filling needles are fluidically connected, by means of a number of tubes, to a source container and/or to a conveying means for conveying the fluid; and the number of tubes cross through a wall of the transfer lock in a sterile manner.

* * * * *